US006485812B1

(12) United States Patent
Sekiguchi

(10) Patent No.: US 6,485,812 B1
(45) Date of Patent: Nov. 26, 2002

(54) INK JET RECORDING SHEET AND PROCESS FOR PRODUCING IT

(75) Inventor: Hideki Sekiguchi, Tokyo (JP)

(73) Assignee: Mitsubishi Paper Mills Limited, Tokyo (JP)

(*) Notice: Subject to any disclaimer, the term of this patent is extended or adjusted under 35 U.S.C. 154(b) by 0 days.

(21) Appl. No.: 09/422,076

(22) Filed: Oct. 21, 1999

(30) Foreign Application Priority Data

Oct. 26, 1998 (JP) .......................................... 10-303773
Sep. 2, 1999 (JP) .......................................... 11-248763

(51) Int. Cl.[7] ............................ B32B 27/14; B32B 3/00

(52) U.S. Cl. ....................... 428/195; 428/323; 428/325; 428/328; 428/331

(58) Field of Search ................................ 428/195, 323, 428/325, 328, 331

(56) References Cited

U.S. PATENT DOCUMENTS 4,929,592 A * 5/1990 Kanto et al. ................ 503/227
5,260,258 A * 11/1993 Ito et al. ..................... 503/227
5,270,285 A * 12/1993 Ito et al. ..................... 503/227
5,439,872 A * 8/1995 Ito et al. ..................... 503/227
5,457,081 A * 10/1995 Takiguchi et al. .......... 503/227
5,508,108 A * 4/1996 Tokiyoski et al. .......... 428/341
5,856,001 A * 1/1999 Okumura et al. ........... 428/331
5,919,291 A * 7/1999 Hotomi et al. ........... 106/15.05
5,965,252 A * 10/1999 Santo et al. ................ 428/329
6,183,851 B1 * 2/2001 Mishima .................. 438/304.4

FOREIGN PATENT DOCUMENTS

| | | |
|---|---|---|
| DE | 199 52 356.8-45 | 5/2001 |
| EP | 0 741 045 A1 | 11/1996 |
| JP | 62089690 A | 4/1987 |
| JP | 01170625 A | 7/1989 |

* cited by examiner

*Primary Examiner*—Bruce H. Hess
*Assistant Examiner*—B. Shewareged
(74) *Attorney, Agent, or Firm*—Oblon, Spivak, McClelland, Maier & Neustadt, P.C.

(57) ABSTRACT

An ink jet recording sheet which comprises a support and at least one ink-receiving layer comprising fine inorganic particles and a binder resin, formed on at least one side of the support, wherein at least one ink-receiving layer contains at least one tetraalkoxytitanium of the following formula 1:

(1)

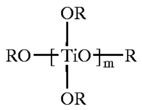

wherein R is an alkyl group, an aryl group or an aralkyl group, and m is a natural number.

19 Claims, No Drawings

INK JET RECORDING SHEET AND PROCESS FOR PRODUCING IT

BACKGROUND OF THE INVENTION

1. Field of the Invention

The present invention relates to an ink jet recording sheet. More particularly, it relates to a high quality ink jet recording sheet which is excellent in water resistance and scratch resistance and free from beading and has good transportability and which is free from an acetic acid odor. Further, it relates to an ink jet recording sheet which is excellent also in blocking resistance while suppressing image bleeding under a high temperature high humidity condition.

2. Discussion of Background

The ink jet recording system is a system wherein fine droplets of ink are jetted by various operational principles such as a deflection, cavity, thermojetting, bubble jetting, thermal ink jetting, slit jetting or spark jetting system, and deposited on an ink jet recording sheet such as a paper sheet to form a record of images or letters. By virtue of its merits such as high speed, low noise, easiness to produce multi-color images, applicability to a wide variety of recording patterns and unnecessity of development or fixation, it has found a wide range of applications in various recording apparatus for figures including Chinese characters and for color images.

Further, images formed by an ink jet recording system using multi-color inks each containing a coloring material of yellow, magenta, cyan or black contained in a solvent such as water or a hydrophilic solvent, are capable of providing a record which is comparable to multi-color printed images by a printing plate system. Still further, when only a small number of prints are required, the ink jet recording system is inexpensive as compared with the development of silver salt photography, and it is being widely used also in the full color image recording field.

The ink jet recording system has been applied to various uses, as a result of developments in technique in recent years. When the use is limited for the output as a hard copy, it can be roughly classified into (1) one for general use (home use and for hobby), (2) one for office use (office automation) and (3) one for business use (EA and factory automation). Particularly for business use, a high quality hard copy of at least 400 dpi (16 dots/mm) is required, and the ink jet recording system is increasingly used.

A high quality hard copy obtainable by the ink jet recording system is prospective also as a substitute for a silver salt photograph. As disclosed, for example, in JP-A-1-95091, JP-A-2-276670, JP-A-3-285814, JP-A-3-285815, JP-A-4-37576, JP-A-5-32037, U.S. Pat. No. 4,879,166 and U.S. Pat. No. 5,104,730, many inventions have been made with respect to an ink jet recording sheet having an ink-receiving layer which comprises alumina hydrate and a binder resin. Such an ink jet recording sheet employing alumina hydrate has merits such that since such alumina hydrate is needle, plate or strand-form fine particles of from a few tens to a few hundreds nm, it has high gloss and transparency, and as it has a positive charge, fixing of a colorant in the ink is good, whereby an excellent optical density can be obtained.

However, such an ink-receiving layer employing alumina hydrate has had the following problems, and by overcoming these problems, it will be possible to provide for the first time an ink jet recording sheet wherein the merits of the alumina hydrate are adequately utilized.

1) Water resistance and scratch resistance may be mentioned as problems relating to an ink-receiving layer employing alumina hydrate. Concerning the water resistance, there has been a problem that when water drops are attached to the surface of the ink-receiving layer or when the ink jet recording sheet is immersed in water, the binder resin in the ink-receiving layer undergoes swelling, or in some cases, the binder resin will be dissolved, whereby the ink-receiving layer will be destroyed. On the other hand, concerning the scratch resistance, there has been a problem such that a mark of a feed roll of an ink jet recording printer is impressed on the surface of the ink-receiving layer, or scratch marks are imparted to the surface of the ink-receiving layer during handling by a user, or in some cases, a part of the layer is peeled off.

To solve such problems, for example, JP-A-7-76161 proposes an alumina sol coating fluid comprising alumina hydrate, polyvinyl alcohol and boric acid or a borate. However, no adequate film strength has been obtained merely by crosslinking polyvinyl alcohol by means of boric acid or a borate, and the resulting film tended to be swelled or was susceptible to scratching, and thus scratch resistance was also inadequate.

Further, JP-A-7-76162 discloses a recording sheet having a silica gel layer having a thickness of from 0.1 to 30 $\mu$m on a pseudo boehmite porous layer for the purpose of improving the abrasion resistance of the recording layer. The mark of a feed roll of an ink jet recording printer can thereby be reduced, but scratch marks are still likely to be imparted during the handling, and thus, there is a room for improvement. Besides, the water resistance has not been improved at all, and swelling or dissolution of the ink-receiving layer by deposition of water can not be avoided. In addition to these methods, various inventions have been made, such as a method wherein a silanol-modified polyvinyl alcohol is employed, and a method wherein as a curing agent for a water-soluble binder resin, a water-soluble polyisocyanate compound, a water-soluble aziridine compound, a water-soluble melamine resin, a water-soluble urea resin, or an aqueous oxazoline resin, is, for example, employed (JP-A-9-76628), or an epoxy or amino-modified compound is incorporated. However, no adequate effects for improvement have been obtained.

2) Along with a recent progress for high image quality of ink jet recording, the ink jetting amount to an ink jet recording sheet is increasing. Especially when an ink having a so-called colorant concentration reduced, such as light cyan or light magenta, is used for the purpose of reducing the granularity of a full color image, higher ink absorptivity is required for an ink jet recording sheet. If adequate ink absorptivity can not be secured, ink is likely to be flooded on the surface of the ink-receiving layer, and also in the interior of the ink-receiving layer, ink drops are likely to be localized and become non-uniform, whereby beading is likely to result.

Heretofore, various inventions have been made to overcome beading in the ink-receiving layer employing alumina hydrate. For example, JP-A-4-263983 proposes to apply a surfactant such as dodecylbenzenesulfonic acid, sodium lauryl sulfate, potassium oleate, sodium stearate, sodium alkylbenzenesulfonate or sodium polyoxyethylenenonylphenylether sulfonate, to a pseudo boehmite surface. Further, JP-A-9-76628 discloses an ink-receiving layer formed by coating a dispersion comprising alumina hydrate surface-treated with a coupling agent, and a binder resin or a polymer compound, followed by drying, or by polymerizing the above-mentioned polymerizable compound.

Further, JP-A-7-232474 proposes to employ alumina hydrate containing from 0.01 to 1.00 wt % of titanium dioxide.

However, none of these methods have been able to adequately overcoming beading.

Further, for the purpose of improving not only scratch resistance of the ink-receiving layer but also transportability, it has been proposed to form an overcoating layer containing fine particles of e.g. silica gel, for example, in JP-A-8-2087 or JP-A-8-3497. In either case, although the transportability can be improved by forming an overcoating layer, beading tends to deteriorate, whereby it is impossible to satisfy both properties. Namely, by forming an overcoating layer, the ink tends to diffuse in a transverse direction in the overcoating layer, whereby beading is accelerated.

Whereas, JP-A-9-76628 discloses an invention which comprises polymerizing or coating and drying on a support a dispersion containing alumina hydrate surface-treated with a coupling agent and a binder or a polymerizable compound to obtain an ink jet recording medium excellent in ink absorptivity and whereby formation of beading is suppressed, the image density is high, the color is clear and the resolution is high. Here, as the coupling agent, various coupling agents of silane type, titanate type, aluminum type or zirconium type, are mentioned. By this prior art invention, the object is accomplished by employing alumina hydrate having its surface preliminarily treated with various coupling agents. Whereas, in the present invention, the water resistance, scratch resistance, suppression of beading and transportability of an ink jet recording sheet can be improved only when a certain specific tetraalkoxytitanium is employed. The tetraalkoxytitanium in the present invention is not usually classified in a so-called coupling agent. For example, it is not one belonging to the titanium coupling agent as clearly described at page 97 or page 469 of "Optimum Application Technique for Coupling agents", published by Kagaku Gijutsu Sogo Kenkyusho (publication date: Feb. 25, 1988).

3) It is known to employ an acid such as hydrochloric acid, nitric acid, sulfuric acid or acetic acid as a peptizer for the preparation of alumina hydrate, for example, in U.S. Pat. No. 2,656,321, Bulent E. Yolds, Am. Ceramic Soc. Bull., 54, 289 (1975), JP-A-57-88074, JP-A-62-56321 and JP-A-7-291621. Among various acids, acetic acid is usually employed, as it is easy to handle and brings about little problem from the viewpoint of the installation for the production, and techniques relating to the content, order of addition, time and temperature control of acetic acid, have become important as they substantially influence the properties of the final alumina hydrate. Further, for example, JP-A-4-67985 discloses post addition of acetic acid to a coating fluid comprising alumina sol and a water-soluble polymer binder, for the purpose of stabilizing the viscosity with time of the coating fluid containing alumina hydrate. Thus, in most cases, acetic acid is incorporated more or less in a coating fluid for an ink-receiving layer employing alumina hydrate, and acetic acid has become an indispensable reagent.

However, with an ink jet recording sheet employing alumina hydrate or a coating fluid containing acetic acid, an acetic acid odor remains in the coated ink-receiving layer and has given an unpleasant smell to the user. Of course, the acetic acid odor can be reduced by intensifying the drying during the formation of the ink-receiving layer, but it has been difficult to completely remove the odor. Ink jet recording sheets are supplied in various forms to the market. Usually, however, they are commercially available in such a form that a few tens sheets of A4 size are enclosed in a polyvinyl chloride bag provided with a zip fastener. In such a supply form, the acetic acid odor is strong when the bag is opened.

4) Further, such ink jet recording sheets have had a problem that when they are stored under a high temperature high humidity condition, recorded images are likely to bleed with time (image bleeding resistance). To solve such a problem, some inventions have been made, including, for example, a recording sheet having formed on a substrate an alumina hydrate layer wherein a carboxylic acid having at least 8 carbon atoms is imparted in an amount of from 0.1 to 10 wt % to alumina hydrate (JP-A-7-276783), a recording sheet having an alumina hydrate layer formed on a substrate, wherein sulfonic acid is imparted to the alumina hydrate layer (JP-A-8-108614), a recording sheet having a porous layer containing alumina hydrate, formed on a substrate, wherein the porous layer contains a neutral aromatic hydrocarbon or its derivative, having a solubility of less than 0.3 in water at 25° C., a melting point of at least 100° C. and a molecular weight of at most 1,000 (JP-A-8-290651), and a recording medium having a porous ink-receiving layer containing alumina hydrate, on a substrate, wherein the porous layer contains an amino acid (JP-A-8-295075). However, no adequate image bleeding resistance has been obtained.

5) Further, with ink jet recording sheets having an ink-receiving layer employing fine inorganic particles of e.g. alumina hydrate or colloidal silica, if the recording sheets are stored as overlaid one on another in a high temperature high humidity condition, blocking is likely to result, whereby there has been a problem that a part of an image falls off, or an ink-receiving layer is press-bonded or transfers to the overlaid recording sheet.

To avoid such a blocking problem, there have been some proposals including, for example, a recording sheet having an ink-receiving layer made of a boehmite porous layer containing resin particles having a spherical or non-specific shape, on a substrate, wherein the resin particles protrude by from 0.1 to 50 μm on the surface (JP-A-8-282088), a recording sheet for an ink jet printer comprising a pseudo boehmite porous layer having a thickness of from 1 to 100 μm, on a substrate, and a silica gel layer formed therein by dispersing and depositing silica particles having an average particle size of from 0.1 to 30 μm together with a silica sol and a binder (JP-A-8-2093), and an ink jet recording sheet comprising an alumina hydrate porous layer having a thickness of from 1 to 100 μm, on a substrate, and a silica gel layer having a thickness of from 0.1 to 30 μm and surface irregularities with a difference in height being at least 0.1 μm formed thereon (JP-A-8-2087).

These inventions were considered to be one of means to suppress formation of blocking, since the contact area when the recording sheets are overlaid one on another, is small. The present inventors have examined blocking resistance under a high temperature high humidity condition with respect to the ink jet recording sheets of the above inventions, whereby it has been found that in order to obtain adequate blocking resistance, a large amount of resin particles or silica particles is required which deteriorates the image bleeding, and thus it is difficult to satisfy both the blocking resistance and the image bleeding resistance.

SUMMARY OF THE INVENTION

Accordingly, it is an object of the present invention to provide an ink jet recording sheet which is excellent in water resistance and scratch resistance of the ink-receiving layer and free from beading and has good transportability and which is of a high quality free from an acetic acid odor.

Another object of the present invention is to provide an ink jet recording sheet which is excellent also in blocking resistance and suppression of image bleeding under a high temperature high humidity condition (image bleeding resistance), while satisfying such properties.

As a result of an extensive study on the above problems relating to the ink jet recording sheets, the present inventors have found it possible to improve water resistance and scratch resistance of the ink-receiving layer and to suppress beading by incorporating a certain specific tetraalkoxytitanium to an ink-receiving layer containing fine inorganic particles and a binder resin.

Such effects have been found to be more remarkable when alumina hydrate or colloidal silica is used as the fine inorganic particles. When such fine inorganic particles are used to form an ink-receiving layer, it used to be difficult to satisfy water resistance and scratch resistance of the ink-receiving layer and particularly to suppress beading, while it is easy to obtain an ink jet recording sheet excellent in the color reproducibility or the optical density. The ink absorptivity of an ink-receiving layer comprising alumina hydrate or colloidal silica, and a binder resin, is inferior to the ink absorptivity of an ink-receiving layer employing synthetic amorphous silica as disclosed, for example, in JP-A-55-51583, JP-A-57-157786 or JP-A-61-141584, whereby beading used to be likely to occur. However, if a specific tetraalkoxytitanium is incorporated in accordance with the present invention, it is possible to suppress beading at least to a level equal to the ink-receiving layer employing synthesized amorphous silica even in the case of an ink-receiving layer employing alumina hydrate or colloidal silica.

Further, the tetraalkoxytitanium readily reacts with acetic acid to form titanium amylate, whereby it is possible to remove an acetic acid odor which used to be a problem specific to an ink-receiving layer employing alumina hydrate.

Further, it is possible to obtain good transportability when the specific tetraalkoxytitanium is incorporated to the outermost ink-receiving layer in an ink jet recording sheet wherein the outermost ink-receiving layer is made of a layer employing colloidal silica.

Furthermore, by incorporating the specific tetraalkoxytitanium and a silicone oil to the ink-receiving layer, it is possible to improve the image bleeding resistance and the blocking resistance. As the silicone oil, preferred is a modified silicone oil which is modified with functional groups having active hydrogen groups.

In the process for producing an ink jet recording sheet of the present invention, at least one ink-receiving layer comprising fine inorganic particles and a binder resin, is coated on at least one side of a support, and then a coating fluid having at least one of the specific tetraalkoxytitanium dissolved in an organic solvent, is overcoated thereon or impregnated thereto, followed by drying.

Namely, the ink jet recording sheet of the present invention is an ink jet recording sheet which comprises a support and at least one ink-receiving layer comprising fine inorganic particles and a binder resin, formed on at least one side of the support, wherein at least one ink-receiving layer contains at least one tetraalkoxytitanium of the following formula 1:

(1)

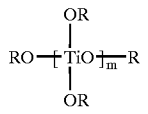

wherein R is an alkyl group, an aryl group or an aralkyl group, and m is a natural number.

Here, if the fine inorganic particles contained in at least one ink-receiving layer, are aluminum hydrate or colloidal silica, it is possible to obtain an ink jet recording sheet which is further excellent in water resistance, scratch resistance and beading resistance.

Further, it is possible to impart good transportability if the ink jet recording sheet is one wherein the outermost ink-receiving layer contains colloidal silica as the fine inorganic particles and at least one tetraalkoxytitanium of the above formula 1.

Furthermore, the image bleeding resistance and the blocking resistance can be improved by incorporating the tetraalkoxytitanium of the formula 1 and a silicone oil to the ink-receiving layer. As the silicone oil, preferred is a modified silicone oil which is modified by functional groups having active hydrogen groups.

This ink jet recording sheet is prepared preferably by a process which comprises coating at least one ink-receiving layer comprising fine inorganic particles and a binder resin, on at least one side of a support, and then, overcoating thereon or impregnating thereto a coating fluid having at least one tetraalkoxytitanium of the formula 1 dissolved in an organic solvent, followed by drying.

Here, if the fine inorganic particles contained in at least one ink-receiving layer, are alumina hydrate or colloidal silica, it is possible to obtain an ink jet recording sheet which is further excellent in water resistance, scratch resistance and beading resistance.

Further, it is possible to impart good transportability, if the outermost ink-receiving layer is a layer employing colloidal silica as the fine inorganic particles.

Furthermore, the image bleeding resistance and the blocking resistance can be improved by incorporating the tetraalkoxytitanium of the formula 1 and a silicone oil to the ink-receiving layer. As the silicone oil, preferred is a modified silicone oil which is modified with functional groups having active hydrogen groups.

DETAILED DESCRIPTION OF THE PREFERRED EMBODIMENTS

Now, the ink jet recording sheet of the present invention will be described in detail.

At least one ink-receiving layer of the ink jet recording sheet in the present invention, contains a tetraalkoxytitanium of the formula 1. The tetraalkoxytitanium is one which is usually obtained by reacting titanium tetrachloride with various alcohols using a dehydrochloric acid agent such as ammonia, and its nature differs depending upon the type of the alcohol. It will be solid in the case of methyl, a colorless or slightly yellow transparent liquid in the case of ethyl or higher and waxy solid at a level of octadecyl.

In the ink jet recording sheet in the present invention, it is particularly preferred to employ a tetraalkoxytitanium of the formula 1 wherein R is a $C_{1-7}$ alkyl group such as methyl, ethyl, propyl, butyl, pentyl (amyl), hexyl or heptyl, or an isomer thereof, a $C_{6-8}$ aryl group such as phenyl, tolyl, xylyl or chlorophenyl, or a $C_{7-9}$ aralkyl group such as benzyl, phenylethyl, methylbenzyl or ethylbenzyl.

Such a tetraalkoxytitanium reacts with functional groups having active hydrogen, such as hydroxyl groups, on the surface of fine inorganic particles such as alumina hydrate or colloidal silica, or hydroxyl groups, amino groups or thiol groups contained in the binder resin, and thus serves as a crosslinking agent and imparts a hydrophobic nature. Here, it is believed that a firm crosslinking action serves to improve the water resistance and the scratch resistance, and beading can efficiently be suppressed by the hydrophobic nature partially imparted. Further, the tetraalkoxytitanium readily reacts with acetic acid remaining in the ink-receiving layer to form titanium acylate, whereby the acetic acid odor can be removed. For example, it is considered that tetra-iso-propoxytitanium reacts with acetic acid, and the acetic acid is converted to isopropyl acetate, which will be evaporated together with the solvent in a drying step.

Here, if the carbon number of the alkyl group exceeds 7, if the carbon number of the aryl group exceeds 8, or if the carbon number of the aralkyl group exceeds 9, the alkyl group, the aryl group or the aralkyl group is too large, whereby the various actions will be mild, and it tends to be difficult to obtain an adequate effect for improving the water resistance or scratch resistance of the ink-receiving layer or an adequate effect for suppressing beading. It is disclosed in "Organic Titanium Compounds, and Its Physical Properties and Applications", Nippon Soda Technical Report, p.14 that various actions of the tetraalkoxytitanium, such as acylation, alcohol exchange, a reaction with active hydrogen or with an organic acid, become mild in proportion to the size of the alkoxy group.

Such a tetraalkoxytitanium may be employed not only as a monomer but also as a polymer. As described hereinafter, the larger the titanium content in the tetraalkoxytitanium, the better. To increase the titanium content in the tetraalkoxytitanium, the alkyl group, the aryl group or the aralkyl group may be made to be small, or it may be formed into a polymer. Taking into consideration a problem in working efficiency, such as the poor handling efficiency or quick hydrolysis of e.g. tetramethoxytitanium or tetraethoxytitanium, it is preferred to employ a tetraalkoxytitanium having alkyl groups in the form of a polymer, particularly preferably in the form of a trimeric or higher polymer. On the other hand, if it is a more than 100-meric polymer, hydrolysis and condensation of tetraalkoxytitanium molecules among themselves may sometimes proceed too much, whereby a titanium oxide film is likely to be formed, thus leading to non-uniform ink absorptivity. Accordingly, for the ink jet recording sheet of the present invention, it is particularly preferred to employ a 3 to 100-meric polymer.

The tetraalkoxytitanium useful for the ink jet recording sheet of the present invention may, for example, be one having a titanium dioxide content of at least about 7 wt %, as obtained by the analysis as disclosed in "Organic Titanium Compounds and Their Physical Properties and Applications", Nippon Soda Technical Report, p. 9, which will be one of indices for improving water resistance or scratch resistance of an ink-receiving layer or improving the effect for suppressing beading. Here, the larger the titanium dioxide content, the better the water resistance and the scratch resistance, and also the effect for suppressing beading will be excellent.

Here, the analysis for the titanium dioxide content will be briefly described. The tetraalkoxytitanium in an amount of from 3 to 5 g is accurately weighed to a level of 0.1 mg and put into an evaporating dish, and 10 ml of ethyl alcohol is added thereto. Further, 5 ml of distilled water is added thereto, and the mixture is thoroughly stirred and hydrolyzed to obtain a white gelled precipitate. Then, the precipitate is heated on a sand bath by a weak heat for 2 hours for evaporation to dryness and further ignited for carbonization. The carbonized product is ignited at a temperature of from 700 to 800° C. and then, cooled to room temperature in a desiccator, whereupon it is weighed. The weight of titanium dioxide on the evaporating dish at that time is divided by the initial amount of the tetraalkoxytitanium, to obtain a percentage, which is taken as the titanium dioxide content (%). For example, the titanium dioxide content of tetrastearyloxytitanium obtained by such a method, is 7 wt %.

As the above-described tetraalkoxytitanium, commercial product may suitably be employed. Typical examples of commercially available tetraalkoxytitanium will be given below, but it should be understood that the present invention is by no means restricted to such specific Examples. For reference, the titanium dioxide content (%) is indicated in brackets ( ). For example, tetra-i-propoxytitanium (tradename A-1, manufactured by Nippon Soda, 28%), tetra-n-butoxytitanium (tradename B-1, manufactured by Nippon Soda, 23.5%) a 10-meric substance of tetra-i-propoxytitanium (tradename A-10, manufactured by Nippon Soda, 39%), a 4-meric substance of tetra-n-butoxytitanium (tradename B-4, manufactured by Nippon Soda, 32.1%), a 7-meric substance of tetra-n-butoxytitanium (tradename B-7, manufactured by Nippon Soda, 34.1%) and a 10-meric substance of tetra-n-butoxytitanium (tradename B-10, manufactured by Nippon Soda, 34.9%) may be mentioned.

The ink-receiving layer on the ink jet recording sheet in the present invention contains fine inorganic particles and a binder resin. Here, the fine inorganic particles and the binder resin may, respectively, be those which are commonly known.

The fine inorganic particles may, for example, be synthetic amorphous silica, precipitated calcium carbonate light, calcium carbonate heavy, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, aluminum hydroxide, alumina, lithopone, zeolite, hydrated halloysite, magnesium carbonate, magnesium hydroxide, alumina hydrate (pseudo boehmite sol), colloidal silica, silica/alumina hybrid sol, smectites clay such as hectorite, or montmorillonite, zirconia sol, chromia sol, yttria sol, ceria sol, iron oxide sol, zircon sol or antimony oxide sol. These fine inorganic particles may be used alone or in combination of two or more of them.

Synthetic amorphous silica may be mentioned as fine inorganic particles widely used for ink jet recording sheets. The synthetic amorphous silica can be produced by employing a method such as an arc method, a dry method or a wet method (a precipitation method or a gelation method) and has characteristics such that the particle size by a Coulter counter method is from 0.1 to 30 μm, the specific surface area by a BET method is from 20 to 400 $m^2$/g, the oil absorption is at least 0.3 ml/g, and the brightness by Hunter is at least 90. Specific examples of such synthetic amorphous silica include the followings:

(1) A synthetic silica or a salt thereof, or a mixture thereof (JP-A-55-51583, JP-A-57-157786).

(2) A synthetic silica having an average particle size of from 2.5 to 3.5 μm and a specific particle size distribution, and at least 20% of the total pores being pores of from 60 to 130 Å (JP-A-61-141584).

(3) A synthetic amorphous silica having a pH of 4 wt % suspension of from 9 to 12, an electroconductivity of from 400 to 1,000 micromho/cm, and a chemical composition $Ni/SiO_2$ ratio of from 0.02 to 0.04 (JP-A-61-230979).

(4) An amorphous silica having a median diameter measured by Coulter counter method of from 2 to 15 μm, an oil absorption of 180 ml/100 g, a refractive index measured by solvent method of at least 1.450, and a moisture absorption of at least 35% under relative humidity of 90% at a temperature of 25° C. for 200 hours (JP-A-62-292476).

(5) Particles of covered silica having amorphous silica particles and a metal compound of Group II of the Periodic Table, said amorphous silica particles having a median diameter measured by Coulter counter method of from 2 to 15 μm, an oil absorption of 180 ml/100 g, a refractive index measured by solvent method of at least 1.450, and a moisture absorption of at least 35% under relative humidity of 90% at a temperature of 25° C. for 200 hours, and having the surface covered with the metal compound in an amount of from 0.5 to 20 wt % as oxide (JP-A-63-306074).

(6) Fine particles of silica having a specific surface area measured by BET method of at least 200 $m^2/g$, and an uniformity number n in Rosin-Rammler distribution of at least 1.10 (JP-B-3-26665).

(7) An alkali added amorphous silica having a specific surface area by BET of at least 200 $m^2/g$, an oil absorption of at least 180 ml/100 g, and an amount of acid at most 0.1 mmol/g to a range of acid strength (HO) +4.8 (JP-A-5-64953).

However, it is particularly preferred to employ alumina hydrate or colloidal silica as the fine inorganic particles, whereby it is possible to obtain even better water resistance and scratch resistance, and to obtain an ink jet recording sheet having beading completely suppressed.

Here, the alumina hydrate may be represented by a compositional formula of $Al_2O_3.aH_2O$. When a in the formula is 1, the alumina hydrate will be of a boehmite structure, when a exceeds 1 and less than 3, the alumina hydrate will be of a pseudo boehmite structure, and when a is higher than that, the alumina hydrate will be of an amorphous structure. As an alumina hydrate to be used in the present invention, an alumina hydrate of a pseudo boehmite structure wherein a is more than 1 and less than 3, is particularly preferred from the viewpoint of the optical density and the color reproducibility.

In order for the ink-receiving layer to have adequate ink absorptivity, the average pore radius of alumina hydrate is preferably from 1 to 10 nm, particularly preferably from 2 to 7 nm. If the pore radius is less than 1 nm, the ink absorptivity tends to be low. On the other hand, if the pore radius exceeds 10 nm, fixing of the colorant in the ink tends to be poor, and the image may bleed as time passes. Further, the pore volume of the alumina hydrate is preferably within a range of from 0.1 to 1.2 ml/g. If the pore volume is less than 0.1 ml/g, the ink absorptivity tends to be poor, and if it exceeds 1.2 ml/g, the strength of the ink-receiving layer will be lower, whereby cracking or powering is likely to result.

In order for the alumina hydrate to adequately absorb the colorant in the ink, the BET specific surface area is preferably within a range of from 70 to 300 $m^2/g$. If the BET specific surface area is less than 70 $m^2/g$, dispersion of the alumina hydrate usually tends to be difficult, whereby a uniform ink-receiving layer tends to be hardly formed. On the other hand, if the BET specific surface area exceeds 300 $m^2/g$, the strength of the ink-receiving layer tends to be low, whereby cracking or powdering is likely to result.

Such an alumina hydrate can be produced by a conventional method such as hydrolysis of an aluminum alkoxide such as aluminum isopropoxide, neutralization of an aluminum salt with an alkali, or hydrolysis of an aluminate. Further, the particle size, pore diameter, pore volume, specific surface area, the number of hydroxyl groups on the surface, etc., of the alumina hydrate can be controlled by the precipitation temperature, the aging time, the pH of the liquid, the liquid concentration, the type of a coexisting salt, etc.

For example, JP-A-57-88074, JP-A-62-56321, JP-A-4-275917, JP-A-6-64918, JP-A-7-10535, JP-A-7-267633, U.S. Pat. No. 2,656,321 and Am. Ceramic Soc. Bull., 54,289 (1975), disclose methods for hydrolyzing aluminum alkoxides. Such aluminum alkoxides include, for example, isopropoxide, propoxide and 2-butoxide. By such methods, alumina hydrates of very high purity can be obtained.

As another method for obtaining an alumina hydrate, it is common to employ a method wherein an inorganic salt of aluminum or its hydrate is used as the starting material, as disclosed in JP-A-54-116398, JP-A-55-23034, JP-A-55-27824 and JP-A-56-120508. Such an inorganic salt may, for example, be an inorganic salt such as aluminum chloride, aluminum nitrate, aluminum sulfate, polyaluminum chloride, ammonium alum, sodium aluminate, potassium aluminate or aluminum hydroxide, or a hydrate of such an inorganic salt.

As a specific example, an alumina hydrate can be produced by a neutralization reaction of an aqueous acidic aluminum salt such as aluminum sulfate, aluminum nitrate or aluminum chloride with an aqueous basic solution such as sodium aluminate, sodium hydroxide or aqueous ammonia. In such a case, it is common to mix them within a range such that the amount of the alumina hydrate formed in the liquid will not exceed 5 wt % and to carry out the reaction under such conditions that the pH is from 6 to 10 and the temperature is from 20 to 100° C. Further, the alumina hydrate may also be produced by a method wherein the pH is alternately changed as between an acidic side and a basic side to let alumina hydrate crystals grow, as disclosed in JP-A-56-120508, or a method wherein an alumina hydrate obtained from an inorganic salt of aluminum and alumina obtained by a Bayer method, are mixed to rehydrate alumina, as disclosed in JP-B-4-33728, whereby it is obtainable as colloidal particles of a fiber form or a flat plate form. More specifically, it may, for example, be as follows:

(1) An alumina sol in the form of a plate having the particle shape of aspect ratio 2 to 10, in a state where the sol diluted with water to a solid content of from 0.01 to 0.1 wt %, is dropped to the collodion membrane which is made hydrophilic followed by drying (JP-A-3-285814).

(2) An alumina sol in a columnar form having the particle shape of aspect ratio being at most 2, in a state where the sol diluted with water to a solid content of from 0.01 to 0.1 wt %, is dropped to the collodion membrane which is made hydrophilic followed by drying (JP-A-3-285815).

(3) An alumina sol produced by a production method of a boehmite organosol wherein a surface active agent is added to a boehmite hydrosol, and transferred to a non-polar organic solvent (JP-A-4-92813).

(4) An alumina sol produced by a production method wherein each of an aqueous alkali aluminate solution and an aqueous caustic alkali solution is introduced in a demineralization chamber and a concentration chamber, respectively, of an electrodialyser having alkali resistant anion exchange membranes and cation exchange membranes alternately arranged, to conduct electrodialysis to obtain an alumina sol (JP-A-7-802, JP-A-7-803).

(5) An alumina sol which is a sol having colloidal particles of alumina hydrate dispersed in an aqueous solvent, and which contains compounds having sulfonic acid groups in the molecule and having a pH of at most 4 in a state of 1 wt % aqueous solution (JP-A-8-33315).

(6) An alumina sol produced by a production method of an alumina sol which comprises hydrolysis of an aluminum alkoxide in an aqueous solvent to obtain a precipitate of alumina hydrate, and peptizing the precipitate to produce an alumina sol, wherein hydrolysis is conducted while alcohol in the solvent is removed (JP-A-6-64918).

(7) An alumina sol containing cations except hydrogen ions so that the total of ion equivalent concentration is within a range of from $2.0\times10^{-4}$ to $1.0\times10^{-}$N, and having a concentration of alumina of at least 10 wt %, and a viscosity measured by Brookfield viscometer of at most 5000 cps (JP-A-8-295509).

(8) An alumina sol having a boehmite structure, wherein the space between the faces of (020) of alumina hydrate is from not smaller than 0.167 to 0.620 nm, and the thickness of crystal in a direction perpendicular to (010) surface is within a range of from 6.0 to 10.0 nm (JP-A-9-99627).

(9) An alumina hydrate having an average pore radius of from 20 to 200 Å, and a half value width of the pore size distribution of from 20 to 150 Å (JP-A-7-232475).

(10) An alumina hydrate containing titanium dioxide in an amount of from 0.01 to 1.00 wt % (JP-A-7-232474).

(11) An alumina hydrate having at least two maximums in the pore radius distribution (JP-A-7-232473).

On the other hand, the colloidal silica is a colloidal dispersion having ultrafine particles of silicic anhydride (silica) stably dispersed in water. More specifically, it is a stabilized aqueous dispersion sol obtained in such a manner that an aqueous sodium silicate solution is passed through a cation exchange resin to obtain a sol wherein $SiO_2/Na_2O$ is from 60 to 130, this sol is grown to independent dispersed particles by heating and aging at a temperature of at least 60° C., and a sol passed through an ion exchange resin layer anew is added thereto for polymerization and precipitation to have the particles grown to an average particles size of from 2 to 300 nm.

Usually, such colloidal silica is spherical. However, various modified colloidal silica may also be suitably used, such as beads-like colloidal silica having at least three particles connected in a straight chain or branched chain form by particle-particle interbonding of primary particles of spherical silica in the presence of bivalent or higher valent metal ions as disclosed in e.g. JP-A-1-294515, JP-A-1-317115, or cationic colloidal silica which is cationically charged by incorporating an organic cationic compound or a polyvalent metal ion compound such as an aluminum ion on the surface or interior of colloidal silica, as disclosed in e.g. JP-A-60-219083 or JP-A-60-219084. Further, an organo colloidal silica may also be employed. Here, the organo colloidal silica is one having the solvent (water) of the colloidal silica as described above substituted by an organic solvent such as methanol, isopropanol, n-butanol, isobutanol, ethylene glycol, xylene or ethyl cellosolve.

The binder resin in the ink-receiving layer may, for example, be polyvinyl alcohol, silanol modified polyvinyl alcohol, polyvinyl acetate, oxidized starch, etherified starch, a cellulose derivative such as carboxymethyl cellulose or hydroxyethyl cellulose, casein, gelatin, acidic gelatin, soybean protein or silyl modified polyvinyl alcohol; maleic anhydride resin, a copolymer latex of conjugated diene type such as a styrene-butadiene copolymer or a methylmethacrylate-butadiene copolymer; an acrylic polymer latex of acrylic type such as a polymer or a copolymer of acrylic ester or methacrylic ester, or a polymer or a copolymer of acrylic acid or methacrylic acid; a polymer latex of vinyl type such as an ethylene-vinyl acetate copolymer; a polymer latex of functional group modified type by a monomer containing functional groups such as a carboxyl group of such polymers; an aqueous adhesive of thermosetting synthetic resin such as an urea resin or a melamine resin; a synthetic resin type adhesive such as polymethyl methacrylate, a polyurethane resin, an unsaturated polyester resin, a vinyl chloride-vinyl acetate copolymer, a polyvinyl butyral or an alkyd resin. These resins may be used alone or in combination as a mixture. Further, known natural or synthetic resin binders may be used alone or in combination as a mixture, without any particular restriction. However, in order to accelerate the reaction with the tetraalkoxytitanium, the binder resin should preferably have functional groups containing active hydrogen, such as hydroxyl groups, amino groups or thiol groups.

Among the above-mentioned binder resins, particularly preferred may be a polyvinyl alcohol having a polymerization degree of at least 2,000 and a saponification degree of at least 88%. Such a polyvinyl alcohol is excellent particularly in the compatibility with alumina hydrate and in the stability with time of the coating fluid, whereby formation of cracks during coating can be prevented. Further, its reaction with the tetraalkoxytitanium is strong, whereby an ink jet recording sheet can be obtained which is excellent in the water resistance, scratch resistance and beading resistance.

The content of the binder resin is preferably from 0.1 to 100 parts by weight, more preferably from 2 to 50 parts by weight, per 100 parts by weight of the fine inorganic particles. If it is less than 0.1 part by weight, the layer strength of the ink-receiving layer tends to be inadequate, and if it exceeds 100 parts by weight, the ink absorptivity tends to be inadequate depending upon the type of the ink jet recording apparatus, whereby the ink is likely to be flooded.

Further, the ink-receiving layer may contain other additives such as a crosslinking agent, a surfactant, a cationic dye-fixing agent, a pigment dispersant, a pH-regulating agent, a thickener, a water repellent, an oil repellent, a flowability-improving agent, a defoaming agent, a foam-suppressant, a release agent, a blowing agent, a penetrating agent, a coloring dye, a coloring pigment, a fluorescent brightening agent, an ultraviolet absorber, a preservative, a fungicide, a water-proofing agent, a wet-strength agent, a dry-strength agent and an antioxidant, as the case requires.

The content of the tetraalkoxytitanium in the ink-receiving layer of the ink jet recording sheet of the present invention, is preferably from 0.01 to 10 parts by weight, more preferably from 0.05 to 5 parts by weight, per 100 parts by weight of the fine inorganic particles. Here, if the content of the tetraalkoxytitanium is less than 0.01 part by weight, the effects for improving the water resistance or scratch resistance of the ink-receiving layer, for suppressing the beading or for removing the acetic acid odor of the ink-receiving layer employing alumina hydrate, tend to be inadequate, and if it exceeds 10 parts by weight, the ink absorptivity is likely to deteriorate, and in some cases, the color reproducibility of an image tends to deteriorate.

On the other hand, the silicone oil to be used for the ink-receiving layer of the ink jet recording sheet of the present invention, is usually one having a linear siloxane structure represented by $R_3SiO—(R_2SiO)_n—SiR_3$. Here, a case where all R are methyl groups, represents the most typical dimethylsilicone oil. Further, various modified silicone oils wherein the methyl groups are replaced by other groups, may be mentioned, including methyl hydrogensilicone oil, methyl phenylsilicone oil, an alkyl-modified silicone oil, an aralkyl-modified silicone oil, a polyether-modified silicone oil, fluorosilicone oil, a fatty acid ester-modified silicone oil, a higher alcohol-modified silicone oil, a fluoroalkylsilicone oil, a silanol group-containing silicone oil, an alkoxy group-containing silicone oil, an amino-modified silicone oil, a carboxylic acid-modified silicone oil, a carbinol-modified silicone oil, an epoxy-modified silicone oil, a mercapto-modified silicone oil and a methacrylic-modified silicone oil. By changing n variously, oils having various viscosities within a range of from 0.65 to 1,000,000 cSt, can be obtained, and their nature ranges from oily to waxy. Further, they may be in the form of aqueous solutions or emulsions.

These silicone oils may be produced by conventional methods disclosed, for example, in F. G. A. Stone and W. A. G. Graham, Inorganic Polymers, Academic Press, pp.230–231 (1962), W. Noll., Chemistry and Technology of Silicones, Academic Press, pp.209–211 (1968), P. F. Bruins, Silicone Technology, Adevision of John Wiley and Sons, pp.64–66 (1970), JP-B-36-22361, JP-B-35-10771, JP-B-43-28694, JP-B-45-14898, U.S. Pat. No. 2,917,480, and UK Patent 916,561.

In the ink-receiving layer of the ink jet recording sheet of the present invention, excellent image bleeding resistance and blocking resistance can be obtained by the combined use of the above-described tetraalkoxytitanium and such a silicone oil. It is particularly preferred to employ a modified silicone oil which is modified with functional groups having active hydrogen. The functional groups having active hydrogen may, for example, be hydroxyl groups, carboxyl groups, amino groups or thiol groups. With a modified silicone oil having such functional groups, it is believed that the functional groups react with the tetraalkoxytitanium, whereby movement of the silicone oil is suppressed, and the image bleeding resistance will be further improved.

For the ink-receiving layer of the ink jet recording sheet of the present invention, it is also preferred to employ a polyethylene oxide-modified silicone oil having its terminals not sealed with inert groups such as acetoxy groups. With a silicone oil wherein one terminal or both terminals of the main chain, or a part of side chains, is modified with polyethylene oxide, the hydrophilic ethylene oxide moiety is readily compatible with the surface of inorganic pigment, while the siloxane main chain is considered to be readily oriented to the surface of the ink-receiving layer, whereby particularly the blocking resistance can further be improved.

As such a silicone oil, commercial products may suitably be employed. Typical commercially available silicone oils will be given below, but it should be understood that the present invention is by no means restricted to such specific examples. For example, dimethylsiloxane may, for example, be SH7036, SM7060, SM8706, SM8708, SH8710, SM8701, SM8705, SM8722, BY12-803, SM7025, BY22-849, BY22-835, BY22-836 (the foregoing, manufactured by Toray Dow Corning Silicone), TSF451, YF3800, XF3905, XF3057, YF3807, YF3802 (the foregoing, manufactured by Toshiba Silicone); methyl hydrogensiloxane may, for example, be SM8707, SH8200, SH8241, BY22-861 (the foregoing, manufactured by Toray Dow Corning Silicone), TSF484, TSF483 (the foregoing, manufactured by Toshiba Silicone); methyl phenylpolysiloxane may, for example, be TSF431, TSF433, TSF434, TSF437, TSF4300, YF3804 (the foregoing, manufactured by Toshiba Silicone); an alkyl-modified silicone may, for example, be SH203, SH230, SF8416 (the foregoing, manufactured by Toray Dow Corning Silicone), TSF4421, TSF4422, XF42-A3160 (the foregoing, manufactured by Toshiba Silicone); a fatty acid-modified silicone may, for example, be TSF410, TSF411 (the foregoing, manufactured by Toshiba Silicone); an amino-modified silicone may, for example, be SF8417, BY16-828, BY16-849, BY16-850, BY16-853 (the foregoing, manufactured by Toray Dow Corning Silicone), TSF4700, TSF4701, TSF4702, TSF4703, TSF4704, TSF4705, TSF4707, XF42-A2645, XF42-A2646 (the foregoing, manufactured by Toshiba Silicone); a carboxyl-modified silicone may, for example, be SF8418, BY16-880 (the foregoing, manufactured by Toray Dow Corning Silicone), TSF4770, TSF4771 (the foregoing, manufactured by Toshiba Silicone); an epoxy-modified silicone may, for example, be SF8411, SF8413, BY16-875, BY16-839 (the foregoing, manufactured by Toray Dow Corning Silicone), TSF4731, YF3965, XF42-A4439, TSF4730, XF42-A4438, TSF4732, XF42-A2262, XF42-A2263 (the foregoing, manufactured by Toshiba Silicone); an alcohol-modified silicone may, for example, be SF8427, SF8428 (the foregoing, manufactured by Toray Dow Corning Silicone), TSF4750, TSF4751 (the foregoing, manufactured by Toshiba Silicone); a polyether-modified silicon may, for example, be SH3771, SH8400 (the foregoing, manufactured by Toray Dow Corning Silicone), TSF4440, TSF4445, TSF4446, TSF4452, TSF4460 (the foregoing, manufactured by Toshiba Silicone); and an alkyl polyether-modified silicone may, for example, be SF8419 (the foregoing, manufactured by Toray Dow Corning Silicone), TSF4450 (the foregoing, manufactured by Toshiba Silicone).

The content of the silicone oil in the ink-receiving layer of the ink jet recording sheet of the present invention is preferably from 0.01 to 10 parts by weight, more preferably from 0.05 to 5 parts by weight, per 100 parts by weight of the fine inorganic particles. If the content of the silicone oil is less than 0.01 part by weight, the effects for improving the image bleeding resistance and the blocking resistance tend to be inadequate, and if it exceeds 10 parts by weight, the ink absorptivity tends to deteriorate, and in some cases, the color reproducibility of an image tends to deteriorate.

In the process for producing an ink jet recording sheet of the present invention, a method for incorporating the tetraalkoxytitanium to the ink-receiving layer may, for example, be such that a tetraalkoxytitanium having a long alkyl group, whereby the hydrolysis is relatively slow, is dispersed directly in the coating fluid for an ink-receiving layer containing water as the main solvent, followed by coating and drying quickly. In the case of a tetraalkoxytitanium having a small number of carbon atoms, which is readily hydrolysable, the objective can be accomplished by adding it to the coating fluid immediately before the coating, followed by coating and drying quickly.

However, most tetraalkoxytitanium is basically readily hydrolysable with water, and when it is incorporated to a coating fluid for an ink-receiving layer containing water, the tetraalkoxytitanium undergoes a condensation reaction by itself to form transparent or semitransparent aggregates, or non-uniform aggregates of fine inorganic particles are likely to form, whereby it sometimes tends to be difficult to adequately accomplish improvements in the water resistance, scratch resistance and suppression of beading.

Therefore, in order to accomplish the object of the present invention efficiently and stably, it is usually advisable to employ a production process wherein an ink-receiving layer is coated without incorporating the tetraalkoxytitanium directly to the coating liquid for an ink-receiving layer containing fine inorganic particles and water as the main solvent, and then a coating fluid having the tetraalkoxytitanium dissolved in an organic solvent is overcoated or impregnated for penetration, followed by drying.

Here, the organic solvent useful for incorporating the tetraalkoxytitanium to the ink-receiving layer, may, for example, be isopropyl alcohol, xylene, toluene, hexane, mineral sprit, kerosene, chlorine-type solvent, ethyl acetate or isopropyl acetate. Preferred is one which is not reactive with the tetraalkoxytitanium. Accordingly, a ketone, methanol, a higher alcohol such as butanol, hexanol or octanol, a higher fatty acid ester, or a polyhydric alcohol such as glycerol or glycol, is not preferred, since such a solvent reduces the effects of the tetraalkoxytitanium.

When the outermost ink-receiving layer in the ink jet recording sheet of the present invention is a layer containing colloidal silica as the fine inorganic particles and the tetraalkoxytitanium, good transportability can also be imparted. Specifically, an ink jet recording sheet may be mentioned as a suitable example wherein an ink-receiving layer employing alumina hydrate as the fine inorganic particles, is coated on a support, and an ink-receiving layer containing colloidal silica and the tetraalkoxytitanium, is laminated thereon as the outermost layer. Here, the tetraalkoxytitanium may be incorporated not only in the outermost layer, but also in both layers.

Accordingly, it is a preferred example of the present invention to accomplish the object by coating and drying a coating fluid having the tetraalkoxytitanium, colloidal silica and a binder resin mixed, on an ink-receiving layer made of alumina hydrate. As mentioned above, the dispersing medium of usual colloidal silica is mainly composed of water, and for the purpose of suppressing hydrolysis of the tetraalkoxytitanium, it is preferred to employ an organocolloidal silica. Here, the organocolloidal silica is one having the solvent (water) of the colloidal silica as mentioned above, substituted by an organic solvent such as methanol, isopropanol, n-butanol, isobutanol, ethylene glycol, xylene or ethylcellosolve.

Usually, such organocolloidal silica is spherical. However, for example, as disclosed in JP-A-1-294515 or JP-A-1-317115, primary particles of spherical silica are subjected to particle-particle interbonding in the presence of bivalent or higher valent metal ions to obtain beads-like colloidal silica having at least three particles connected in the form of a straight or branched chain, which may be subjected to solvent substitution to obtain an organocolloidal silica.

As the above-mentioned organocolloidal silica, commercial products may suitably be employed. Typical commercial products of organocolloidal silica will be given below, but it should be understood that the present invention is by no means restricted to such specific examples.

For example, Snowtex Colloidal Silica IPA-ST (manufactured by Nissan Chemical Industries, Ltd., 30% dispersion in isopropanol), Snowtex Colloidal Silica EG-ST (manufactured by Nissan Chemical Industries, Ltd., 20% dispersion in ethylene glycol), Snowtex Colloidal Silica EG-STL (manufactured by Nissan Chemical Industries, Ltd., 20% dispersion in ethylene glycol), Snowtex Colloidal Silica XBA-ST (manufactured by Nissan Chemical Industries, Ltd., 30% dispersion in xylene/butanol) and Snowtex Colloidal Silica ETC-ST (manufactured by Nissan Chemical Industries, Ltd., 20% dispersion in ethylcellosolve), may be mentioned.

As the binder resin for the organocolloidal silica, a binder resin which can be used for the ink-receiving layer, may suitably be used. Further, known natural or synthetic resin binders may be used alone or in combination as a mixture. However, in order to accelerate the reaction with the tetraalkoxytitanium, the binder resin preferably has functional groups containing active hydrogen, such as hydroxyl groups, amino groups or thiol groups.

Among such binder resins, particularly preferred is a polyvinyl acetal resin, particularly a polyvinyl butyral resin. Such a resin is excellent in the compatibility with organocolloidal silica particles and in the bonding properties and also has a strong reactivity with the tetraalkoxytitanium, whereby a good ink-receiving layer will be formed, and it will be possible to obtain an ink jet recording sheet excellent in water resistance, scratch resistance, suppression of beading and transportability.

The content of the binder resin is preferably from 0.1 to 50 parts by weight, more preferably from 2 to 10 parts by weight, per 100 parts by weight of the organocolloidal silica. If it is less than 0.1 part by weight, the layer strength of the ink-receiving layer tends to be inadequate, whereby the organocolloidal silica may fall off. On the other hand, if it exceeds 50 parts by weight, the ink absorptivity tends to be poor depending upon the type of the ink jet recording apparatus, whereby the ink is likely to be flooded, such being undesirable.

In the ink jet recording sheet of the present invention thus prepared, the tetraalkoxytitanium penetrates also in the lower ink-receiving layer immediately after the coating and then dried, whereby not only in the outermost ink-receiving layer, but also in the lower ink-receiving layer or at the interface of both layers, the tetraalkoxytitanium reacts to provide excellent effects for the water resistance, scratch resistance, suppression of beading and suppression of the acetic acid odor and to further improve the transportability. Further, by incorporating the above-mentioned silicone oil to the coating fluid having the tetraalkoxytitanium dissolved in an organic solvent, it is possible to improve the image bleeding resistance and the blocking resistance.

The support for the ink jet recording sheet of the present invention includes:

(a) A base paper made from a chemical pulp such as LBKP or NBKP, a mechanical pulp such as GB, PGW, RMP, TMP, CTMP, CMP or CGP, or a natural pulp including a waste paper pulp such as DIP, and a known pigment, as the main components, made by using a slurry having a binder and at least one additive such as a sizing agent, a primer, a yield-improving agent, a cation agent or a strength agent mixed therewith, and produced by various apparatus such as a Fourdrinier paper machine, a cylinder paper machine or a twin wire paper machine;

(b) A coated paper made of a base paper having size press by e.g. starch or a polyvinyl alcohol or an anchor coat layer formed thereon, or an art paper, a coat paper or a cast coat paper having a coat layer provided on said base paper thus obtained;

(c) A base paper having smoothing treatment applied by using a calender apparatus such as a machine calender, a TG calender or a soft calender;

(d) A resin coat paper made from a base paper or a coated paper, having both sides or one side coated with a high density or low density polyethylene, polypropylene or polyester by e.g. melt extrusion;

(e) A transparent synthetic resin film of e.g. polyethylene terephthalate, polypropylene, polyethylene, polyester, polycarbonate, norbornene, vinylon, polyvinyl alcohol or nylon, or a translucent or opaque synthetic resin film having e.g. a pigment or a blowing agent incorporated in such a material, to decrease the transparency;

(f) A synthetic paper made by mixing a thermoplastic resin such as polyethylene, polypropylene, an ethylene/propylene copolymer, an ethylene/vinyl acetate copolymer, polystyrene or a polyacrylate ester, with an inorganic pigment such as calcium carbonate, talc, silica or claimed clay, followed by stretching and laminating;

(g) One made of such a support having the surface treated by e.g. a corona discharge treatment, a flame treatment, a plasma treatment or an anchor layer coating treatment, to improve adhesion.

The basis weight of the support is usually from 50 to 300 $g/m^2$.

The coating amount on the ink-receiving layer is not particularly limited. However, it is preferably from 1 to 50 g/m . If it is less than 1 g/m , an adequate printing density and ink absorptivity are less likely to be obtained, and if it exceeds 50 $g/m^2$, the curling property of the ink jet recording sheet tends to deteriorate.

On the other hand, the coating amount in a case where an ink-receiving layer containing colloidal silica is formed on an ink-receiving layer containing alumina hydrate, is preferably from 0.05 to 10 $g/m^2$. If the coating amount is less than 0.05 $g/m^2$, it tends to be difficult to improve the transportability, and if the coating amount exceeds 10 $g/m^2$, the ink absorptivity may sometimes be hindered, whereby the ink tends to be flooded, such being undesirable.

In the present invention, the ink-receiving layer is formed on the support by using water or a hydrophilic organic solvent, or a mixed solvent thereof, or an organic solvent, by means of known various apparatus such as an air knife coater, a curtain coater, a die coater, a lip coater, a blade coater, a gate roll coater, a bar coater, a rod coater, a roll coater, a bill blade coater, a short dwell blade coater, a size press or a film transfer coater.

Here, it is possible to coat a certain amount of the ink-receiving layer on the support in installments. As the method for coating the ink-receiving layer on the support in installments, after a layer gets dry, the next layer may be coated thereon, or a plurality of layers are simultaneously coated in a wet-on-wet fashion.

Particularly in the case of using a base paper, a coated paper or a resin-coated paper, as the support for the ink jet recording sheet of the present invention, a back coat layer may be coated on the other side of the support having the ink-receiving layer formed thereon, to impart curling property. As the pigment used here, a pigment in the form of a plate and hydrated halloysite are preferred. Curling straightening can also be conducted by jetting moisture by the humidifier such as fluidex, even in a case of not forming a back coat layer.

Further, the support having the ink-receiving layer coated thereon may be subjected to a smoothing treatment by means of a calender apparatus such as a machine calender, a TG calender, a super calender or a soft calender.

As the ink for the ink jet recording of the present invention, a known ink may be suitably used. In view of e.g. clarity of the image or the safety of the ink itself, aqueous inks employing the following coloring materials are commonly used. The coloring materials include direct dyes such as C.I.Direct Yellow 12, C.I.Direct Yellow 24, C.I.Direct Yellow 26, C.I.Direct Yellow 44, C.I.Direct Yellow 86, C.I.Direct Yellow 98, C.I.Direct Yellow 100, C.I.Direct Yellow 142, C.I.Direct red 1, C.I.Direct red 4, C.I.Direct red 17, C.I.Direct red 28, C.I.Direct red 83, C.I.Direct Orange 34, C.I.Direct Orange 39, C.I.Direct Orange 44, C.I.Direct Orange 46, C.I.Direct Orange 60, C.I.Direct Violet 47, C.I.Direct Violet 48, C.I.Direct Blue 6, C.I.Direct Blue 22, C.I.Direct Blue 25, C.I.Direct Blue 71, C.I.Direct Blue 86, C.I.Direct Blue 90, C.I.Direct Blue 106, C.I.Direct Blue 199, C.I.Direct Black 17, C.I.Direct Black 19, C.I.Direct Black 32, C.I.Direct Black 51, C.I.Direct Black 62, C.I.Direct Black 71, C.I.Direct Black 108, C.I.Direct Black 146 and C.I.Direct Black 154, acidic dyes such as C.I.Acid Yellow 11, C.I.Acid Yellow 17, C.I.Acid Yellow 23, C.I.Acid Yellow 25, C.I.Acid Yellow 29, C.I.Acid Yellow 42, C.I.Acid Yellow 49, C.I.Acid Yellow 61, C.I.Acid Yellow 71, C.I.Acid red 1, C.I.Acid red 6, C.I.Acid red 8, C.I.Acid red 32, C.I.Acid red 37, C.I.Acid red 51, C.I.Acid red 52, C.I.Acid red 80, C.I.Acid red 85, C.I.Acid 87, C.I.Acid red 92, C.I.Acid red 94, C.I.Acid red 115, C.I.Acid red 180, C.I.Acid red 256, C.I.Acid red 317, C.I.Acid red 315, C.I.Acid Orange 7, C.I.Acid Orange 19, C.I.Acid Violet 49, C.I.Acid Blue 9, C.I.Acid Blue 22, C.I.Acid Blue 40, C.I.Acid Blue 59, C.I.Acid Blue 93, C.I.Acid Blue 102, C.I.Acid Blue 104, C.I.Acid Blue 113, C.I.Acid Blue 117, C.I.Acid Blue 120, C.I.Acid Blue 167, C.I.Acid Blue 229, C.I.Acid Blue 234, C.I.Acid Blue 254, C.I.Acid Black 2, C.I.Acid Black 7, C.I.Acid Black 24, C.I.Acid Black 26, C.I.Acid Black 31, C.I.Acid Black 52, C.I.Acid Black 63, C.I.Acid Black 112 and C.I.Acid Black 118, basic dyes, reactive dyes and coloring matters for food.

On the other hand, as proposed in JP-A-57-10660, JP-A-57-10661, JP-A-4-234467, JP-A-5-156189, JP-A-5-179183, JP-A-5-202324, JP-A-5-263029, JP-A-5-331397, JP-A-6-122846 or JP-A-6-136311, the ink jet recording can be conducted by the ink containing a pigment as the coloring material. The pigment may, for example, be an azo pigment such as Para Nitraniline Red, Toluidine Red, Fire Red, Naphthylamine Bordeaux, Ortho Nitraniline Orange, Permanent Red G, Lake Fast Orange 3GL, Lithol Red, Lake Red C or Lake Red D, a slightly soluble azo pigment such as Watchung Red, Brilliant Carmine 6B, Bordeaux 10B, Mars Light, Yellow GL, Orange G or Naphthol ASITR, an insoluble azo pigment such as Permanent Red FR, Permanent Red FRLL, Permanent Red FGR, Permanent Red FBL, Permanent Red FRR, Carmine BS, Fast Yellow G, Fast Yellow 3G, Fast Yellow 5G, Fast Yellow 10G, Fast Yellow GR, Benzidine Yellow, Benzidine Yellow R, Benzidine Yellow GR, Benzidine Yellow G or Benzidine Yellow 5G, a phthalocyanine pigment such as copper (II) phthalocyanine, chlorinated copper phthalocyanine or metal-free phthalocyanine, a quinacridone pigment such as Sincasia Red Y, Sincasia Red B or Sincasia Red R, a dioxazine pigment such as triphendioxadine, carbazoledioxadine violet or violet, a building dye pigment such as Anthrapyrimidine Yellow, Frabanthron Yellow, anthrone Scarlet, Indanthrone Blue, Isobeoranthron violet, Thioindigo Bordeaux, Thioindigo maroon, pellinone orange, maroon or Scarlet, a condensed azo pigment, an isoindolinone pigment or an inorganic pigment such as carbon black, titanium oxide, zinc white, a lead chromate pigment or a cadmium pigment.

Further, as proposed in JP-B-7-78187, JP-B-7-78188, JP-B-8-6057, JP-B-8-26259, JP-A-6-247034 or JP-A-6-306319, the ink jet recording can also be conducted by employing an oil ink using an oil-soluble dye as the coloring material, such as a naphthol dye, an azo dye, a metal complex day, an anthraquinone dye, a quinoimine dye, an indigo dye, a cyanine dye, a quinoline dye, a nitro dye, a nitroso dye, a benzoquinone dye, a carbonium dye, a naphthoquinone dye, a naphthalimide dye, a phthalocyanine dye or a penilline dye.

Specifically, the oil-soluble dye may, for example, be C.I.Solvent Yellow 1, 2, 3, 4, 6, 7, 8, 10, 12, 13, 14, 16, 18, 19, 21, 25, 25: 1, 28, 29, 30, 32, 33, 34, 36, 37, 38, 40, 42, 43, 44, 47, 48, 55, 56, 58, 60, 62, 64, 65, 72, 73, 77, 79, 81, 82, 83, 83: 1, 85, 88, 89, 93, 94, 96, 98, 103, 104, 105, 107, 109, 112, 114, 116, 117, 122, 123, 124, 128, 129, 130, 131, 133, 134, 135, 138, 139, 140, 141, 143, 146, 147, 148, 149, 150, 151, 152, 153, 157, 158, 159, 160: 1, 161, 162, 163, 164, 165, 167, 168, 169, 170, 171 or 172; C.I.Solvent Red 1, 2, 3, 4, 7, 8, 13, 14, 17, 18, 19, 23, 24, 25, 26, 27, 29, 30, 33, 35, 37, 39, 41, 42, 43, 45, 46, 47, 48, 49, 49: 1, 52, 68, 69, 72, 73, 74, 80, 81, 82, 83, 83: 1, 84, 84: 1, 89, 90, 90: 1, 91, 92, 106, 109, 111, 117, 118, 119, 122, 124, 125, 127, 130, 132, 135, 138, 140, 143, 145, 146, 149, 150, 151, 152, 155, 160, 164, 165, 166, 168, 169, 172, 175, 176, 177, 179, 180, 181, 182, 185, 188, 189, 195, 198, 202, 203, 204, 205, 206, 207, 208, 209, 210, 212, 213, 214, 215, 216, 217, 218, 219, 220, 221, 222, 223, 224, 225, 226, 227, 228 or 229; C.I.Solvent Blue 2, 4, 5, 7, 10, 11, 12, 22, 25, 26, 35, 36, 37, 38, 43, 44, 45, 48, 49, 50, 51, 59, 63, 64, 66, 67, 68, 70, 72, 79, 81, 83, 91, 94, 95, 97, 98, 99, 100, 102, 104, 105, 111, 112, 116, 117, 118, 122, 127, 128, 129, 130, 131, 132, 133 or 134; or C.I.Solvent Black 3, 5, 6, 7, 8, 13, 22, 22: 1, 23, 26, 27, 28, 29, 33, 34, 35, 39, 40, 41, 42, 43, 45, 46, 47, 48, 49 or 50.

Among these, C.I.Solvent Yellow 3, 14, 16, 33 or 56, C.I.Solvent Red 18, 24, 27, 122 or 135, C.I.Solvent Blue 14, 25, 35, 48 or 108, or C.I.Solvent Black 3, 7, 22, 34 or 50 is preferred as it has high fastness.

In view of safety or suitability for the ink ejection head of the ink jet recording apparatus, various solvents are selected for the oil-soluble ink. A plurality of solvents may be mixed as the case requires.

The solvent may, for example, be a petroleum naphtha solvent such as Pegasol manufactured by Mobil Sekiyu K.K., Shell SBR or Shellsol manufactured by Showa Shell Sekiyu K.K.; an aromatic petroleum solvent such as Hisol manufactured by Nippon Oil Co., Ltd., an aliphatic petroleum solvent such as Soltol manufactured by Philips Petroleum Intl. Ltd., Exxsol manufactured by Exxon Chemical Japan, Ltd. Isopar manufactured by Exxon Chemical Japan, Ltd., or IP Solvent manufactured by Idemitsu Petrochemical Co., Ltd.; a naphthene petroleum solvent such as Ink Solvent manufactured by Mitsubishi Oil Co., Ltd; an alkyl derivative such as mono- or di-substituted alkylnaphthalene or biphenyl, an aromatic hydrocarbon solvent such as xylylethane or phenethylcumene; a $C_{1-4}$ alkyl alcohol such as methyl alcohol, ethyl alcohol, n-propyl alcohol, isopropyl alcohol, n-butyl alcohol, sec-butyl alcohol, tert-butyl alcohol or isobutyl alcohol; an amide such as dimethylformamide or dimethylacetamide; a ketone or a ketone alcohol such as acetone or diacetone alcohol; an ether such as tetrahydrofuran or dioxane; a polyalkylene glycol such as polyethylene glycol or polypropylene glycol; an alkylene glycol having 2–6 alkylene groups such as ethylene glycol, propylene glycol, butylene glycol, triethylene glycol, 1,2,6-hexane triol, thiodiglycol, hexylene glycol or diethylene glycol; a lower alkylether of a polyhydric alcohol such as glycerol, ethylene glycol methylether, diethylene glycol methyl (or ethyl) ether or triethylene glycol monomethylether; a phosphoric ester such as tributyl phosphate, tri-2-ethylhexyl phosphate, triphenyl phosphate or tricresyl phosphate; a phthalic acid ester such as dimethyl phthalate, diethyl phthalate, dibutyl phthalate, diheptyl phthalate, di-n-octyl phthalate, di-2-ethylhexyl phthalate, diisononyl phthalate, octyldecyl phthalate or butylbenzyl phthalate; an aliphatic monobasic acid ester such as butyl oleate or glycerol monooleate; an aliphatic dibasic acid ester such as dibutyl adipate, di-2-ethylhexyl adipate, alkyl adipate 610, di-2-ethylhexyl azelate, dibutyl sebacate or di-2-ethylhexyl sebacate; an oxyacid ester such as methylacetyl ricinolate, butylacetyl ricinolate, butylphthalylbutyl glycolate or tributylacetyl citrate; or a plasticizer such as chlorinated paraffin, chlorinated biphenyl, 2-nitrobiphenyl, dinonylnaphthalene, o- or p-toluenesulfone ethylamide, camphor or methyl abietate.

Further, as proposed in JP-A-6-247034 or JP-A-6-306319, the ink jet recording can be conducted by using an oil based ink for so-called heat fusion type ink jet recording. For the oil based ink for heat fusion type ink jet recording, the following solvents are commonly used.

The solvent may, for example, be a wax such as polyethylene wax, ozokerite, ceresin, candelilla wax, rice wax, jojoba solid wax, bees wax, lanolin, spermaceti, Fischer-Tropsch Wax, carnauba wax, paraffin wax, sazol wax, microcrystalline wax or ester wax; a diol such as 1,8-octanediol, 1,10-decanediol or 1,12-dodecanediol; a fatty acid such as lauric acid, stearic acid or palmitic acid; an aliphatic amide such as lauric acid amide, stearic acid amide, oleic acid amide, erucic acid amide, recinoleic acid amide, 12-hydroxystearic acid amide or a special fatty acid amide; an N-substituted fatty acid amide of the formula RCONHR' or RNHCOR' CONHR; an alkylol amide; a higher alcohol such as cetyl alcohol or stearyl alcohol; an aromatic compound such as an aromatic ester or an aromatic alcohol; a monohydric alcohol fatty acid ester such as methyl laurylate, methyl myristate, methyl palmitate, methyl stearate, coconut fatty acid methyl, isopropyl myristate, butyl stearate, octadecyl stearate or oleyl oleate; a polyhydric alcohol fatty acid ester such as glycerol fatty acid ester, sorbitan fatty acid ester, propylene glycol fatty acid ester, ethylene glycol fatty acid ester or polyoxyethylene fatty acid ester; an epoxy resin; a polyamide resin; a polyester resin; a polyacrylic resin; a polyurethane resin; or a polyolefin resin.

With regard to the above-mentioned various oil based inks, in order to improve the storage stability or rub resistance after printed, a polar resin such as a polyacrylic ester, a linseed oil denatured alkyd resin, polystyrene, a rosin resin, a terpenephenol resin or an alkylphenol denatured xylene resin may be added thereto. An additive may also be suitably incorporated therein such as a metal-sealing agent, a surface tension-adjusting agent, a surface active agent, a viscosity-adjusting agent, a defoaming agent, a foam-suppressing agent, a release agent, a blowing agent, a penetrating agent, a fluorescent brightening agent, an ultraviolet absorber, a preservative, a water proofing agent, a rheology modifier or an antioxidant.

EXAMPLES

Now, the present invention will be explained with reference to Examples. However, it should be understood that the present invention is by no means restricted to such specific Examples. Further, in the Examples, "parts" and "%" mean "parts by weight" and "% by weight", respectively, unless otherwise specified.

Each ink jet recording sheet obtained in following Examples and Comparative Examples was evaluated by the following methods.

(1) Water Resistance 5 ml of city water was dropped on the surface of the ink-receiving layer of each ink jet recording sheet and left to stand in an environment of 20° C. under relative humidity of 65% for one day, whereupon the portion on which the city water was dropped, was visually evaluated in accordance with the following standards.

◎: Good without any trace eroded by the city water.

○: A thin whitening portion was observed, but gave no influence over the image quality.

Δ: The layer was partially eroded, and blisters were observed.

X: The layer was eroded, many blisters were observed, and partial dissolution of the layer was observed.

(2) Scratch Resistance

A cotton gauze was pressed under a load of 300 g on the surface of the ink-receiving layer of each ink jet recording sheet, and a 100 times abrasion test was carried out by means of an abrasion testing machine (manufactured by Suga Shikenki), whereupon the scratched degree of the surface was evaluated in accordance with the following standards.

◎: No scratches were observed.

○: Slight scratches were observed, but gave no influence over the image quality.

Δ: Scratches were relatively many, the gloss deteriorated partially.

X: Scratches were distinct, deterioration of the gloss was substantial, and the image quality was thereby poor.

(3) Beading

Solid printing of cyan and green was carried out on each ink jet recording sheet by means of a color ink jet printer (BJC420J, manufactured by Canon; photo ink). The state of beading of the solid-printed portion of each color was visually evaluated in accordance with the following standards.

◎: No beading was observed.

○: A thin beading was slightly observed, but gave no influence over the image quality.

Δ: Beading was partially observed.

X: Beading was distinct, and the image quality was thereby poor.

(4) Transportability

100 Sheets of A4 size were prepared with respect to each ink jet recording sheet and continuously fed to a color ink jet printer (BJC420J, manufactured by Canon) at 20° C. under a relative humidity of 65%, whereby the number of times where multiple sheets were fed as stuck together, was counted. Of course, the smaller the counted number, the better.

(5) Acetic Acid Odor

10 Sheets of A4 size were prepared with respect to each ink jet recording sheet, packaged in a polyvinyl chloride bag with a zipper and left to stand for one day. Thereafter, the package was opened, and the odor was directly smelled and evaluated in accordance with the following standards.

○: No acetic acid odor was present.

Δ: Acetic acid odor was slightly present.

X: Acetic acid odor was distinct.

(6) Image Bleeding Resistance

Black dots (6×5 dots) were printed on each ink jet recording sheet by means of a color ink jet printer (BJC820, manufactured by Canon) and then left to stand for 48 hours under a high temperature high humidity condition of 40° C. and a relative humidity of 80%. The dot diameters (diameters corresponding to circles) L before and after being left at the high temperature high humidity condition were calculated by the following formula by means of an image analyzing apparatus (Luzex, manufactured by Nireco, measuring conditions: 16,000 pixels, one pixel: 4 $\mu$m), whereby the dot bleeding ratio K was obtained. Here, the larger the value of K, the larger the image bleeding.

$$L=[(4/\pi)\times A]^{1/2}$$

where A is the area ($\mu m^2$).

$$K(\%)=L_1/L_0\times 100$$

where $L_0$ is the dot diameter prior to being left under the high temperature high humidity condition, and $L_1$ is the dot diameter after being left under the high temperature high humidity condition.

(7) Blocking Resistance

With respect to each ink jet recording sheet, two sheets of A4 size were put together, and a weight of 5 g/cm$^2$ was placed thereon, whereupon they were left for 48 hours under a high temperature high humidity condition of 40° C. and a relative humidity of 80%. Thereafter, the two ink jet recording sheets were peeled, whereby the blocking degree was visually evaluated.

◎: No blocking was observed.

○: No substantial blocking was observed, and no scratch was observed on the ink-receiving layer.

Δ: Blocking was partially observed, and scratches were observed on the ink-receiving layer.

X: Blocking was observed over the entire surface, and partial falling off of the ink-receiving layer was observed.

Now, Examples of the ink jet recording sheets of the present invention and Comparative Examples thereto will be described.

Example 1

To 100 parts of wood pulp comprising 90 parts of LBKP having a freeness of 380 mlcsf and 10 parts of NBKP having a freeness of 480 mlcsf, 20 parts of a pigment comprising precipitated calcium carbonate light and heavy calcium carbonate with a ratio of 1:1, 0.10 part of commercially available alkylketene dimer, 0.03 part of commercially available cation type polyacryl amide, 1.0 part of commercially available cationic starch and 0.5 part of aluminum sulfate were added, and the mixture was sheeted by a Fourdrinier paper machine to obtain a neutral base paper having a basis weight of 120 g/m$^2$.

On this base paper, an ink-receiving layer coating fluid having the following composition, was coated by an air knife coater so that the dry coating amount was 11 g/m$^2$, followed by drying.

Composition of Ink-receiving Layer Coating Fluid

| | |
|---|---|
| Synthetic amorphous silica (Finesil X37B, manufactured by Tokuyama Corp. | 100 parts |
| PVA (Gohsenol GH23, manufactured by Nippon Synthetic Chemical Industry Co., Ltd., 10% aqueous solution) | 400 parts |
| Water | 320 parts |

Then, a tetraalkoxytitanium fluid having the following composition, was coated on the ink-receiving layer by a gravure coater, so that the dry coating amount was 0.6 g/m$^2$, followed by drying at 90° C. for 1 minute, to obtain an ink jet recording sheet of Example 1.

Tetraalkoxytitanium Fluid

| | |
|---|---|
| Tetraalkoxytitanium (formula ka-3) | 5 parts |
| n-hexane | 95 parts |
| $Ti-[-OCH(CH_3)_2]_4$ | (ka-3) |

Example 2

An ink jet recording sheet of Example 2 was prepared in the same manner as in Example 1 except that the composition of the ink-receiving layer coating fluid was changed to the following composition.

Composition of Ink-receiving Layer Coating Fluid

| | |
|---|---|
| Dry method fine particulate silica (Aerosil 200, manufactured by Nippon Aerosil Co., Ltd.) | 100 parts |
| PVA (Gohsenol GH23, manufactured by Nippon Synthetic Chemical Industry Co., Ltd., 10% aqueous solution) | 400 parts |
| Water | 320 parts |

Example 3

An ink jet recording sheet of Example 3 was prepared in the same manner as in Example 2 except that the tetraalkoxytitanium fluid was changed to have the following composition.

Tetraalkoxytitanium Fluid

| | |
|---|---|
| Tetraalkoxytitanium (formula ka-4) | 5 parts |
| n-hexane | 95 parts |
| $Ti-[-O(CH_2)_3CH_3]_4$ | (ka-4) |

Example 4

An ink jet recording sheet of Example 4 was prepared in the same manner as in Example 2 except that the tetraalkoxytitanium fluid was changed to have the following composition.

Tetraalkoxytitanium Fluid

| | |
|---|---|
| Tetraalkoxytitanium (formula ka-5) | 5 parts |
| n-hexane | 95 parts |

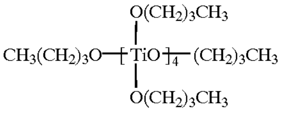

Example 5

An ink jet recording sheet of Example 5 was prepared in the same manner as in Example 1 except that the composition of the ink-receiving layer coating fluid was changed to the following composition, and the dry coating amount was changed to 25 $g/m^2$.

Composition of Ink-receiving Layer Coating Fluid

| | |
|---|---|
| Colloidal silica (Snowtex OL40, manufactured by Nissan Chemical Industries, Ltd., 40% aqueous dispersion) | 100 parts |
| PVA (Gohsenol GH23, manufactured by Nippon Synthetic Chemical Industry Co., Ltd., 10% aqueous solution) | 32 parts |

Example 6

An ink jet recording sheet of Example 6 was prepared in the same manner as in Example 5 except that the tetraalkoxytitanium fluid was changed to have the following composition.

Tetraalkoxytitanium Fluid

| | |
|---|---|
| Tetraalkoxytitanium (formula ka-6) | 5 parts |
| n-hexane | 95 parts |

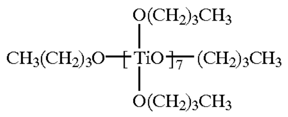

Example 7

An ink jet recording sheet of Example 7 was prepared in the same manner as in Example 5 except that the tetraalkoxytitanium fluid was changed to have the following composition.

Tetraalkoxytitanium Fluid

| | |
|---|---|
| Tetraalkoxytitanium (formula ka-7) | 5 parts |
| n-hexane | 95 parts |

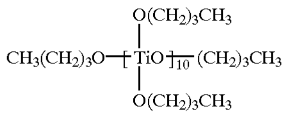

Example 8

On a transparent film of polyethylene terephthalate, manufactured by Du Pont (thickness: 100 μm, treated by hydrophilic treatment), an ink-receiving layer coating fluid having the following composition was coated by a lip coater, so that the dry coating amount was 35 $g/m^2$, followed by drying at 120° C. for 2 minutes. Here, the 10% aqueous dispersion of alumina hydrate contained acetic acid as a peptizing agent.

Composition of Ink-receiving Layer Coating Fluid

| | |
|---|---|
| Alumina hydrate (Cataloid AS-3, manufactured by Catalysis & Chemicals Industries Co., Ltd., 10% aqueous dispersion) | 100 parts |
| PVA (Gohsenol GH23, manufactured by Nippon Synthetic Chemical Industry Co., Ltd., 10% aqueous solution) | 8 parts |

Then, a tetraalkoxytitanium fluid having the following composition was coated on the ink-receiving layer by a gravure coater, so that a dry coating amount was 0.6 $g/m^2$, followed by drying at 90° C. for 1 minute, to obtain an ink jet recording sheet of Example 8.

Tetraalkoxytitanium Fluid

| | |
|---|---|
| Tetraalkoxytitanium (formula ka-3) | 5 parts |
| n-hexane | 95 parts |

Examples 9 to 15

Ink jet recording sheets of Examples 9 to 15 were prepared in the same manner as in Example 8 except that the tetraalkoxytitanium fluid was changed to have the following composition.

Tetraalkoxytitanium Fluid

| | |
|---|---|
| Tetraalkoxytitanium (formula ka-4 to ka-10) | 5 parts |
| n-hexane | 95 parts |
| $Ti{+}OC_6H_5]_4$ | (ka-8) |
| $Ti{+}OC_6H_4(CH_3)]_4$ | (ka-9) |
| $Ti{+}OCH_2(C_6H_5)]_4$ | (ka-10) |

Comparative Examples 1 to 3

Ink jet recording sheets of Comparative Examples 1 to 3 were prepared in the same manner as in Examples 1, 2 and 3, respectively, except that the tetraalkoxytitanium fluid was not coated.

Comparative Example 4

On a transparent film of polyethylene terephthalate, manufactured by Du Pont (thickness: 100 μm, treated by hydrophilic treatment), an ink-receiving layer coating fluid having the following composition was coated by a lip coater, so that a dry coating amount was 35 $g/m^2$, followed by drying at 120° C. for 2 minutes.

Composition of Ink-receiving Layer Coating Fluid

| | |
|---|---|
| Alumina hydrate (Cataloid AS-3, manufactured by Catalysis & Chemicals Industries Co., Ltd., 10% aqueous dispersion) | 100 parts |
| PVA (Gohsenol GH23, manufactured by Nippon Synthetic Chemical Industry Co., Ltd., 10% aqueous solution) | 8 parts |

Then, a surfactant solution having the following composition was coated on the ink-receiving layer by a gravure coater, so that a dry coating amount was 0.2 $g/m^2$, followed by drying at 90° C. for 1 minute to obtain an ink jet recording sheet of Comparative Example 4. This ink jet recording sheet is in accordance with the recording sheet disclosed in JP-A-4-263983.

Surfactant Solution

| | |
|---|---|
| Sodium poloxyethylenedodecylether sulfonate | 5 parts |
| Water | 95 parts |

Comparative Example 5

An alumina hydrate containing titanium dioxide was prepared in the same manner as disclosed in Example 1 of JP-A-7-232474, and an ink-receiving layer coating fluid having the following composition was prepared. At that time, acetic acid was added as a peptizing agent to obtain the alumina hydrate. This ink-receiving layer coating fluid was coated on a transparent film of polyethylene terephthalate manufactured by Du Pont (thickness: 100 μm, treated by hydrophilic treatment) by a lip coater, so that a dry coating amount was 35 $g/m^2$, followed by drying at 120° C. for 2 minutes, to obtain an ink jet recording sheet of Comparative Example 5.

Composition of Ink-receiving Layer Coating Fluid

| | |
|---|---|
| Alumina hydrate containing titanium dioxide (15% aqueous dispersion) | 100 parts |
| PVA (Gohsenol NH18, manufactured by Nippon Synthetic Chemical Industry Co., Ltd., 10% aqueous solution) | 15 parts |

Comparative Example 6

An alumina hydrate treated with a titanium coupling agent (isopropyltri(N-aminoethyl-aminoethyl)-titanate, Plenact KR-44, manufactured by Ajinomoto Co., Inc.) by a wet method, was prepared in the same manner as disclosed in Example 14 of JP-A-9-76628, and an ink-receiving layer coating fluid having the following composition was prepared. An ink jet recording sheet of Comparative Example 6 was prepared in the same manner as in Comparative Example 1 except that the ink-receiving layer coating fluid having the following composition, was used.

Composition of Ink-receiving Layer Coating Fluid

| | |
|---|---|
| Alumina hydrate treated with titanium coupling agent (10% methylcellosolve dispersion) | 100 parts |
| PVA (Gohsenol GH23, manufactured by Nippon Synthetic Chemical Industry Co., Ltd., 10% aqueous solution) | 18 parts |
| Water-soluble melamine resin (Sumirez Resin 613 Special (manufactured by Sumitomo Chemical Co., Ltd., 100%) | 0.45 part |

Comparative Example 7

An ink jet recording sheet of Comparative Example 7 was prepared in the same manner as in Example 8 except that the tetraalkoxytitanium fluid was changed to the titanium coupling agent fluid having the following composition. Here, the titanium coupling agent was the same component as isopropyltrimethylstearoyl titanate used in Example 15 of JP-A-9-76628.

Titanium Coupling Agent Fluid

| | |
|---|---|
| Titanium coupling agent (Prenact KR-TTS, manufactured by Ajinomoto Co., Inc., 100%) | 5 parts |
| n-hexane | 95 parts |

The results of evaluation relating to the respective ink jet recording sheets of Examples 1 to 15 and Comparative Examples 1 to 7 are summarized in Table 1.

TABLE 1

| Example No. or Comparative Example No. | Water resist-ance | Scratch resist-ance | Suppression of beading | Transport-ability | Acetic acid odor |
|---|---|---|---|---|---|
| Example 1 | ○ | ○ | ○ | 5 | — |
| Example 2 | ○ | ○ | ○ | 4 | — |
| Example 3 | ○ | ○ | ○ | 5 | — |
| Example 4 | ○ | ○ | ○ | 6 | — |
| Example 5 | ◎ | ○ | ○ | 5 | — |
| Example 6 | ◎ | ◎ | ◎ | 4 | — |
| Example 7 | ◎ | ◎ | ◎ | 5 | — |
| Example 8 | ◎ | ○ | ○ | 5 | ○ |
| Example 9 | ◎ | ○ | ○ | 4 | ○ |
| Example 10 | ◎ | ◎ | ◎ | 4 | ○ |
| Example 11 | ◎ | ◎ | ◎ | 4 | ○ |
| Example 12 | ◎ | ◎ | ◎ | 5 | ○ |
| Example 13 | ◎ | ◎ | ◎ | 5 | ○ |
| Example 14 | ◎ | ◎ | ◎ | 5 | ○ |
| Example 15 | ◎ | ◎ | ◎ | 5 | ○ |
| Comparative Example 1 | Δ | Δ | Δ | 5 | — |
| Comparative Example 2 | x | x | x | 5 | — |
| Comparative Example 3 | x | x | Δ | 5 | x |
| Comparative Example 4 | x | x | Δ | 5 | x |
| Comparative Example 5 | x | x | Δ | 4 | x |
| Comparative Example 6 | ○ | Δ | Δ | 5 | — |
| Comparative Example 7 | x | x | x | 5 | x |

Evaluation

With the ink jet recording sheets of Examples 1 to 15 of the present invention, the water resistance, the scratch resistance and suppression of beading were improved, as shown in Table 1. Especially with the ink jet recording sheets of Example 5 to 15, wherein an alumina hydrate or colloidal silica was employed as the fine inorganic particles, it was possible to obtain further improved water resistance and scratch resistance, and it was also possible to suppress beading. Further, in Examples 8 to 15, high quality ink jet recording sheets were obtained without the odor of acetic acid employed as a peptizing agent.

Whereas, in Comparative Examples 1 to 3, wherein the tetraalkoxytitanium of the present invention was not employed, the respective properties were very poor. Further, in Comparative Examples 4 to 7, it was not possible to improve the respective properties to satisfactory levels.

Now, Examples and Comparative Examples will be given with respect to the ink jet recording sheets of the present invention which are excellent in transportability wherein the outermost ink-receiving layer contains colloidal silica as the fine inorganic particles and the tetraalkoxytitanium.

Example 16

On a transparent film of polyethylene terephthalate manufactured by Du Pont (thickness: 100 μm, treated with hydrophilic treatment), an ink-receiving layer coating fluid having the following composition was coated by a lip coater, so that a dry coating amount was 35 g/$m^2$ followed by drying at 120° C. for 2 minutes.

Composition of Ink-receiving Layer Coating Fluid

| | |
|---|---|
| Alumina hydrate (Cataloid AS-3, manufactured by Catalysis & Chemicals Industries Co., Ltd., 10% aqueous dispersion) | 100 parts |
| PVA (Gohsenol GH23, manufactured by Nippon Synthetic Chemical Industry Co., Ltd., 10% aqueous solution) | 8 parts |

Then, on the ink-receiving layer, the outermost ink-receiving layer coating fluid having the following composition was coated by a gravure coater, so that a dry coating amount was 1.0 g/$m^2$, followed by drying at 90° C. for 1 minute, to obtain an ink jet recording sheet of Example 16.

Outermost Ink-receiving Layer Coating Fluid

| | |
|---|---|
| Colloidal silica (Snowtex Colloidal Silica IPA-ST, manufactured by Nissan Chemical Industries, Ltd., 20% IPA dispersion) | 10 parts |
| Binder resin (polyvinyl butyral, Esrex BX-1, manufactured by Sekisui Chemical Co., Ltd., 10% methylcellosolve solution) | 1 part |
| Tetraalkoxytitanium (formula ka-3) | 5 parts |
| n-hexane | 126 parts |

Examples 17 to 23

Ink jet recording sheets of Examples 17 to 23 were prepared in the same manner as in Example 16 except that the tetraalkoxytitanium contained in the outermost ink-receiving layer was changed to those represented by the formulae ka-4 to ka-10.

Comparative Example 8

The same silica gel layer composition as for the recording sheet disclosed in Example 1 of JP-A-8-2093, was coated and dried on the ink-receiving layer in the same manner as in Example 16 to obtain an ink jet recording sheet of Comparative Example 8.

Composition of Silica Gel Layer Coating Fluid

| | |
|---|---|
| Spherical silica (Sildex, manufactured by Asahi Glass Co., Ltd.) | 5 parts |
| Binder resin (PVA105, manufactured by Kuraray Co., Ltd., 20% aqueous solution) | 0.25 part |
| Water | 163 parts |

Comparative Example 9

The same silica gel layer composition as for the recording sheet disclosed in Example 1 of JP-A-7-76162, was coated and dried on the ink-receiving layer in the same manner as in Example 16, to obtain an ink jet recording sheet of Comparative Example 9.

Composition of Silica Gel Layer Coating Fluid

| | |
|---|---|
| Silica sol (Snowtex O, manufactured by Nissan Chemical Industries, Ltd., particle size: 10–20 nm, 20% aqueous dispersion) | 50 parts |
| Binder resin (silanol-modified PVA, R1130, manufactured by Kuraray Co., Ltd., 10% aqueous solution) | 10 parts |
| Water | 160 parts |

The results of evaluation relating to the ink jet recording sheets of Examples 16 to 23 and Comparative Example 8 and 9 are summarized in Table 2.

TABLE 2

| Example No. or Comparative Example No. | Water resist-ance | Scratch resist-ance | Suppression of beading | Transport-ability | Acetic acid odor |
|---|---|---|---|---|---|
| Example 16 | ⊚ | ○ | ○ | 0 | ○ |
| Example 17 | ⊚ | ○ | ○ | 0 | ○ |
| Example 18 | ⊚ | ⊚ | ⊚ | 0 | ○ |
| Example 19 | ⊚ | ⊚ | ⊚ | 0 | ○ |
| Example 20 | ⊚ | ⊚ | ⊚ | 0 | ○ |
| Example 21 | ⊚ | ⊚ | ⊚ | 0 | ○ |
| Example 22 | ⊚ | ⊚ | ⊚ | 0 | ○ |
| Example 23 | ⊚ | ⊚ | ⊚ | 0 | ○ |
| Comparative Example 8 | x | x | x | 0 | x |
| Comparative Example 9 | x | x | x | 1 | x |

Evaluation

With the ink jet recording sheets of Examples 16 to 23 of the present invention, the water resistance, the scratch resistance, suppression of beading and suppression of an acetic acid odor were improved, and the transportability was excellent.

On the other hand, in Comparative Examples 8 and 9, the transportability was good, but beading was substantial, and it was not possible to satisfy both properties.

Example 24

On a polyethylene terephthalate film having the surface treated by hydrophilic treatment (thickness: 120 $\mu$m, manufactured by ICI), an ink-receiving layer coating fluid having the following composition was coated by a rod bar, so that a dry coating amount was 20 $g/m^2$ followed by drying at 100° C. for 5 minutes.

Composition of Ink-receiving Layer Coating Fluid

| | |
|---|---|
| Synthetic amorphous silica (Aerosil 200, manufactured by Nippon Aerosil Co., Ltd.) | 100 parts |
| PVA (PVA235, manufactured by Kuraray Co., Ltd., 10% aqueous solution) | 200 parts |
| Water | 1,400 parts |

Then, on the ink-receiving layer, a top coating fluid having the following composition containing a tetraalkoxytitanium and silicone oil, was coated by a rod bar, so that a dry coating amount was 0.8 $g/m^2$, followed by drying at 90° C. for 1 minute, to obtain an ink jet recording sheet of Example 24.

Top Coating Fluid

| | |
|---|---|
| Tetraalkoxytitanium (formula ka-3) | 5 parts |
| n-hexane | 95 parts |

Example 25

An ink jet recording sheet of Example 25 was prepared in the same manner as in Example 24 except that the top coating fluid was changed to have the following composition.

Top Coating Fluid

| | |
|---|---|
| Tetraalkoxytitanium (formula ka-3) | 5 parts |
| Silicone oil (dimethylsilcone oil, BY16-817, manufactured by Toshiba Silicone Co., Ltd.) | 5 parts |
| n-hexane | 90 parts |

Example 26

An ink jet recording sheet of Example 26 was prepared in the same manner as in Example 25 except that the composition of the ink-receiving layer coating fluid was changed to the following composition.

Composition of Ink-receiving Layer Coating Fluid

| | |
|---|---|
| Silica alumina hybrid sol (MOX170, manufactured by Nippon Aerosil co., Ltd.) | 100 parts |
| PVA (GH23, manufactured by The Nippon Synthetic Chemical Industry Co., Ltd., 10% aqueous solution) | 200 parts |
| Water | 1,400 parts |

Example 27

An ink jet recording sheet of Example 27 were prepared in the same manner as in Example 26 except that the top coating fluid was changed to have the following composition.

Top Coating Fluid

| | |
|---|---|
| Tetraalkoxytitanium (formula ka-4) | 5 parts |
| Silicone oil (alkyl-modified silicone oil, SF8416, manufactured by Toshiba Silicone Co., Ltd.) | 5 parts |
| n-hexane | 90 parts |

Example 28

An ink jet recording sheet of Example 28 was prepared in the same manner as in Example 26 except that the top coating fluid was changed to have the following composition.

Top Coating Fluid

| | |
|---|---|
| Tetraalkoxytitanium (formula ka-5) | 5 parts |
| Silicone oil (dimethylsilcone oil, BY16-817, manufactured by Toshiba Silicone Co., Ltd.) | 5 parts |
| n-hexane | 90 parts |

Example 29

An ink jet recording sheet of Example 29 was prepared in the same manner as in Example 25 except that the composition of the ink-receiving layer coating fluid was changed to the following composition.

Composition of Ink-receiving Layer Coating Fluid

| | |
|---|---|
| Colloidal silica (Snowtex OL40, manufactured by Nissan Chemical Industries, Ltd., 40% aqueous dispersion) | 100 parts |
| PVA (GH23, manufactured by The Nippon Synthetic Chemical Industry Co., Ltd., 10% aqueous solution) | 64 parts |

Example 30

An ink jet recording sheet of Example 30 was prepared in the same manner as in Example 29 except that the top coating fluid was changed to have the following composition.

Top Coating Fluid

| | |
|---|---|
| Tetraalkoxytitanium (formula ka-6) | 5 parts |
| Silicone Oil (alkyl-modified silicone oil, SF8416, manufactured by Toshiba Silicone Co., Ltd.) | 5 parts |
| n-hexane | 90 parts |

Example 31

An ink jet recording sheet of Example 31 was prepared in the same manner as in Example 25 except that the composition of the ink-receiving layer coating fluid was changed to the following composition.

Composition of Ink-receiving Layer Coating Fluid

| | |
|---|---|
| Alumina hydrate (AS3, manufactured by Catalysis and Chemicals Industries Co., ltd. 10% aqueous dispersion) | 100 parts |
| PVA (GH23, manufactured by The Nippon Synthetic Chemical Industry Co., Ltd., 10% aqueous solution) | 16 parts |

Example 32

An ink jet recording sheet of Example 32 was prepared in the same manner as in Example 31 except that the top coating fluid was changed to have the following composition.

Top Coating Fluid

| | |
|---|---|
| Tetraalkoxytitanium (formula ka-7) | 5 parts |
| Silicone oil (alkyl-modified silicone oil, SF8416, manufactured by Toshiba Silicone Co., Ltd.) | 5 parts |
| n-hexane | 90 parts |

Example 33

An ink jet recording sheet of Example 33 was prepared in the same manner as in Example 25 except that the top coating fluid was changed to have the following composition.

Top Coating Fluid

| | |
|---|---|
| Tetraalkoxytitanium (formula ka-3) | 5 parts |
| Silicone oil (amino-modified silicone oil, BY16-850, manufactured by Toshiba Silicone Co., Ltd.) | 5 parts |
| n-hexane | 90 parts |

Example 34

An ink jet recording sheet of Example 34 was prepared in the same manner as in Example 26 except that the top coating fluid was changed to have the following composition.

Top Coating Fluid

| | |
|---|---|
| Tetraalkoxytitanium (formula ka-8) | 5 parts |
| Silicone oil (alcohol-modified silicone oil, BY16-848, manufactured by Toshiba Silicone Co., Ltd.) | 5 parts |
| n-hexane | 90 parts |

Example 35

An ink jet recording sheet of Example 35 was prepared in the same manner as in Example 29 except that the top coating fluid was changed to have the following composition.

Top Coating Fluid

| | |
|---|---|
| Tetraalkoxytitanium (formula ka-9) | 5 parts |
| Silicone oil (alcohol-modified silicone oil, BY16-848, manufactured by Toshiba Silicone Co., Ltd.) | 5 parts |
| n-hexane | 90 parts |

Example 36

An ink jet recording sheet of Example 36 was prepared in the same manner as in Example 31 except that the top coating fluid was changed to have the following composition.

Top Coating Fluid

| | |
|---|---|
| Tetraalkoxytitanium (formula ka-10) | 5 parts |
| Silicone oil (amino-modified silicone oil, BY16-850, manufactured by Toshiba Silicone Co., Ltd.) | 5 parts |
| n-hexane | 90 parts |

Comparative Examples 10 to 12

Ink jet recording sheets of Comparative Examples 10 to 12 were prepared in the same manner as in Examples 25, 26 and 31, respectively, except that the top coating fluid was not coated.

Comparative Example 13

Using stearic acid as a carboxylic acid having at least 8 carbon atoms, as proposed in JP-A-7-276783, a 10% ethanol solution thereof was coated on the ink-receiving layer of the ink jet recording sheet of Comparative Example 12 by a rod bar so that it was 5 wt % to the alumina sol in the ink-receiving layer, followed by drying at 140° C. for 1 minute, to obtain an ink jet recording sheet of Comparatives Example 13.

The results of evaluation relating to the respective ink jet recording sheets of Examples 24 to 36 and Comparative Examples 10 to 13, are summarized in Table 3.

TABLE 3

| Example No. or Comparative Example No. | Water resistance | Scratch resistance | Suppression of beading | Image bleeding resistance | Blocking resistance |
|---|---|---|---|---|---|
| Example 24 | ○ | ○ | ○ | 120 | Δ |
| Example 25 | ○ | ○ | ○ | 111 | ○ |
| Example 26 | ○ | ○ | ○ | 111 | ○ |
| Example 27 | ○ | ○ | ○ | 110 | ○ |
| Example 28 | ○ | ○ | ○ | 110 | ○ |
| Example 29 | ◎ | ◎ | ◎ | 106 | ◎ |
| Example 30 | ◎ | ◎ | ◎ | 107 | ◎ |
| Example 31 | ◎ | ◎ | ◎ | 107 | ◎ |
| Example 32 | ◎ | ◎ | ◎ | 107 | ◎ |
| Example 33 | ○ | ○ | ○ | 104 | ◎ |
| Example 34 | ○ | ○ | ○ | 104 | ◎ |
| Example 35 | ◎ | ◎ | ◎ | 103 | ◎ |
| Example 36 | ◎ | ◎ | ◎ | 100 | ◎ |
| Comparative Example 10 | x | Δ | x | 127 | x |
| Comparative Example 11 | x | Δ | x | 128 | x |
| Comparative Example 12 | x | Δ | x | 127 | x |
| Comparative Example 13 | x | x | x | 124 | x |

Evaluation

As shown in Table 3, with the ink jet recording sheets of Examples 25 to 36, the image bleeding resistance and the blocking resistance were improved over the ink jet recording sheet of Example 24. Especially with the ink jet recording sheets of Examples 29 to 32, wherein alumina hydrate or colloidal silica was used as the fine inorganic particles, it was possible to obtain a further improved image bleeding resistance and blocking resistance. Further, in Examples 33 to 36, especially good image bleeding resistance was obtained, as the silicone oil was a silicone oil modified with active hydrogen groups.

Whereas, in Comparative Examples 10 to 13 wherein the tetraalkoxytitanium and silicone oil of the present invention were not used, the respective properties were very poor.

In the ink jet recording system, improvements in instruments such as printers or plotters have progressed, and it has now been possible to output fine high quality images at a low cost. In the future, the ink jet recording system will be widely employed as a substitute system for silver salt photography. Under these circumstances, it is very important to improve the water resistance, the scratch resistance and suppression of beading in the ink jet recording sheets, and it is also essential to realize stabilized transportability. According to the present invention, it is possible to present an ink jet recording sheet which is excellent in water resistance and scratch resistance and free from beading and which has good transportability. Further, it is also possible to eliminate an acetic acid odor which used to be a problem in an ink jet recording sheet wherein an alumina hydrate is used in the ink-receiving layer. While satisfying these properties, it is possible to present an ink jet recording sheet which is excellent also in blocking resistance and which is capable of suppressing an image bleeding even under a high temperature high humidity condition (excellent in the image bleeding resistance).

What is claimed is:

1. An ink jet recording sheet which comprises a support and at least one ink-receiving layer comprising inorganic particles and a binder resin, formed on at least one side of the support, wherein at least one ink-receiving layer contains at least one tetraalkoxytitanium of the following formula 1:

(1)

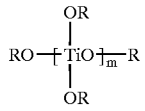

wherein R is a $C_1$–$C_6$ alkyl group, a $C_6$–$C_8$ aryl group or a $C_7$–$C_9$ aralkyl group, and m is a natural number.

2. The ink-jet recording sheet according to claim 1, wherein the inorganic particles are alumina hydrate or colloidal silica.

3. The ink-jet recording sheet according to claim 2, wherein the outer most ink-receiving layer contains colloidal silica as the inorganic particles, and at least one tetraalkoxytitanium of the formula 1.

4. The ink-jet recording sheet according to claim 1, wherein the ink-receiving layer containing at least one tetraalkoxytitanium of the formula 1, contains a silicone oil.

5. The ink-jet recording sheet according to claim 4, wherein the silicone oil is a modified silicone oil which is modified with functional groups having active hydrogen groups.

6. A process for producing the ink jet recording sheet of claim 1, which comprises coating at least one ink-receiving layer comprising inorganic particles and a binder resin, on at least one side of a support, and then, overcoating thereon or impregnating thereto a coating fluid having at least one tetraalkoxytitanium of the formula 1 dissolved in an organic solvent, followed by drying.

7. The process for producing an ink jet recording sheet according to claim 6, wherein the inorganic particles are alumina hydrate or colloidal silica.

8. The process for producing an ink-jet recording sheet according to claim 7, wherein the outer most ink-receiving layer contains colloidal silica as the inorganic particles, and at least one tetraalkoxytitanium of the formula 1.

9. The process for producing an ink-jet recording sheet according to claim 6, wherein the ink-receiving layer containing at least one tetraalkoxytitanium of the formula 1, contains a silicone oil.

10. The process for producing an ink-jet recording sheet according to claim 9, wherein the silicone oil is a modified silicone oil which is modified with functional groups having active hydrogen groups.

11. The ink jet recording sheet according to claim 1, wherein the inorganic particles in a sol have a particle size in the range 2–300 nm.

12. A method of recording an image or letters on the ink jet recording sheet of claim 1, comprising jetting droplets of ink onto said ink jet recording sheet by deflection, cavity, thermojetting, bubble jetting, thermal ink jetting, slit jetting, or spark jetting.

13. The ink jet recording sheet according to claim 1, wherein the inorganic particles have a particle size in the range 0.1 to 30 μm.

14. The ink jet recording sheet according to claim 1, wherein the alkyl group is selected from the group consisting of methyl, ethyl, propyl, butyl, pentyl and hexyl.

15. The ink jet recording sheet according to claim 1, wherein the aryl group is selected from the group consisting of phenyl, tolyl, xylyl and chlorophenyl.

16. The ink jet recording sheet according to claim 1, wherein the aralkyl group is selected from the group consisting of benzyl, phenyl ethyl, methyl benzyl and ethyl benzyl.

17. The ink jet recording sheet according to claim 1, wherein R is an $C_1$–$C_5$ alkyl group, an $C_6$–$C_8$ aryl group or an $C_7$–$C_9$ aralkyl group.

18. The ink jet recording sheet according to claim 1, wherein the tetraalkoxy titanium is tetra-i-propoxy titanium.

19. The ink jet recording sheet according to claim 1, wherein the tetraalkoxy titanium is tetra-n-butoxy titanium.

* * * * *